United States Patent [19]
Maekawa

[11] Patent Number: 5,629,515
[45] Date of Patent: May 13, 1997

[54] RADIATION MEASURING SYSTEM HAVING SCINTILLATION DETECTORS COUPLED BY OPTICAL FIBERS FOR MULTIPOINT MEASUREMENT

[75] Inventor: Tatsuyuki Maekawa, Tokyo-To, Japan

[73] Assignee: Kabushiki Kaisha Toshiba, Kawasaki, Japan

[21] Appl. No.: 405,997

[22] Filed: Mar. 17, 1995

[30] Foreign Application Priority Data

Mar. 23, 1994 [JP] Japan .................. 6-051876

[51] Int. Cl.⁶ .................................. G01T 1/20
[52] U.S. Cl. ............... 250/207; 250/367; 250/368
[58] Field of Search .................. 250/366, 367, 250/368, 227.21, 207

[56] References Cited

U.S. PATENT DOCUMENTS

| | | | |
|---|---|---|---|
| 4,870,280 | 9/1989 | Yamashita et al. | 250/368 |
| 4,931,646 | 6/1990 | Koechner | 250/367 |
| 4,975,583 | 12/1990 | Spowart | 250/364 |
| 5,118,940 | 6/1992 | Davis et al. | 350/308 |
| 5,331,961 | 7/1994 | Inaba et al. | 128/659 |
| 5,391,878 | 2/1995 | Petroff | 250/367 |
| 5,434,415 | 7/1995 | Teranda et al. | 250/368 |

*Primary Examiner*—Stephone Allen
*Attorney, Agent, or Firm*—Foley & Lardner

[57] ABSTRACT

A radiation measuring apparatus capable of measuring radiation by means of few measuring devices without requiring use of power sources, electronic circuits, etc. in places of measurement, and of carrying out high-efficiency multipoint measurement at low cost. Each scintillation detector is provided with two light outlet ports at the opposite ends thereof, individually, and a plurality of scintillation detectors are connected in series with one another by means of optical fibers. The optical fibers are connected individually to the opposite ends of each scintillation detector, and the optical fibers of a plurality of scintillation detectors are connected in parallel with one another. Also provided is a wavelength shifter which absorbs a scintillation light and emits a fluorescence corresponding thereto so that the fluorescence is transmitted to the photoelectric transfer element through the two light outlet ports and the optical fibers, and allows a fluorescence transmitted from another scintillation detector through the optical fibers to pass. The wavelength shifter being in optical contact with another wavelength shifter, which is in optical contact with a scintillator.

25 Claims, 16 Drawing Sheets

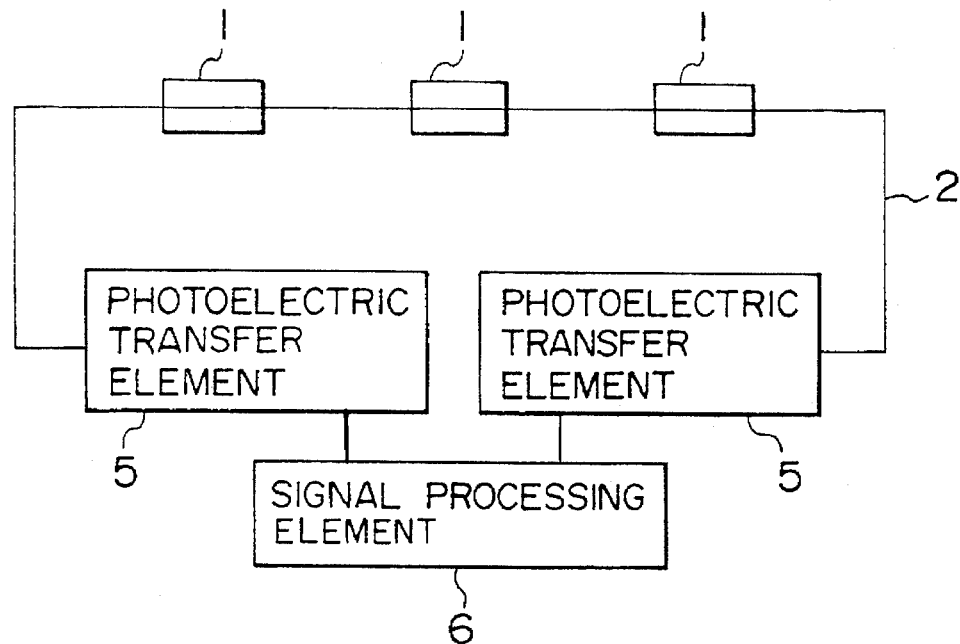
F I G. 1
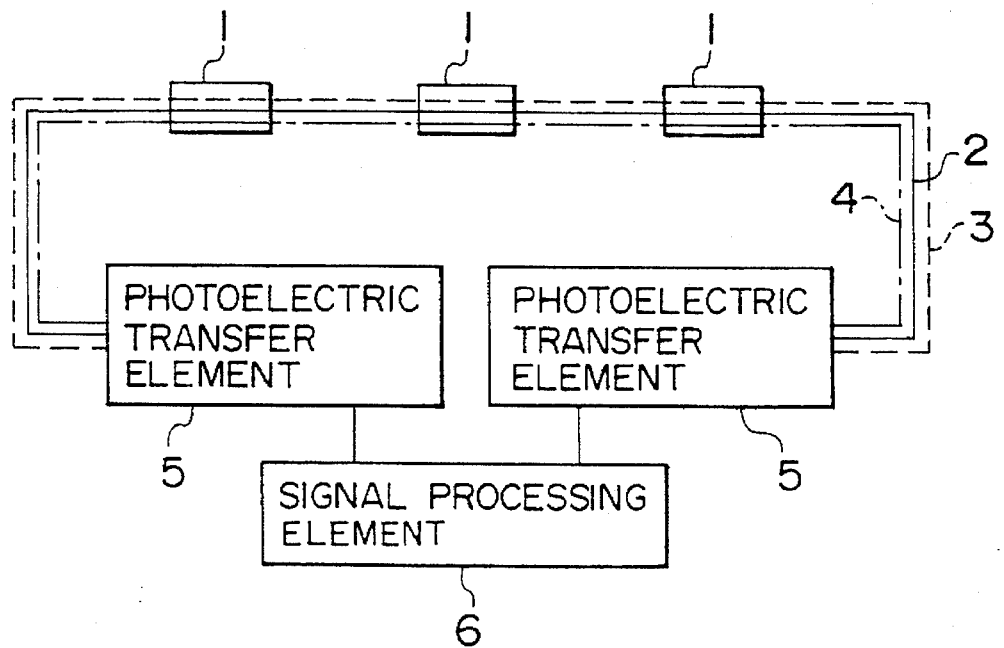
F I G. 2

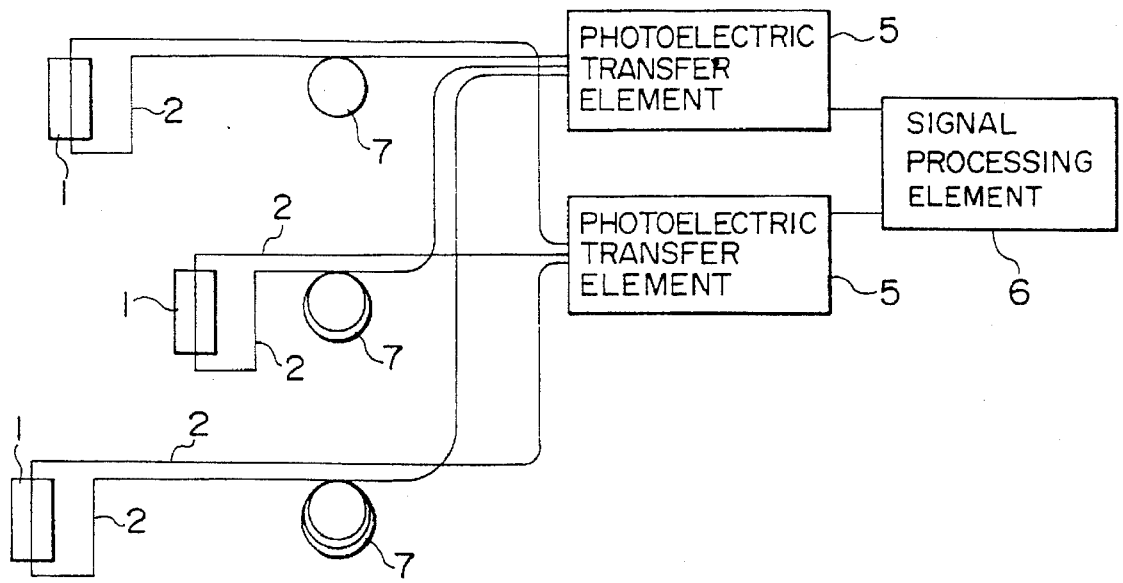
F I G. 5
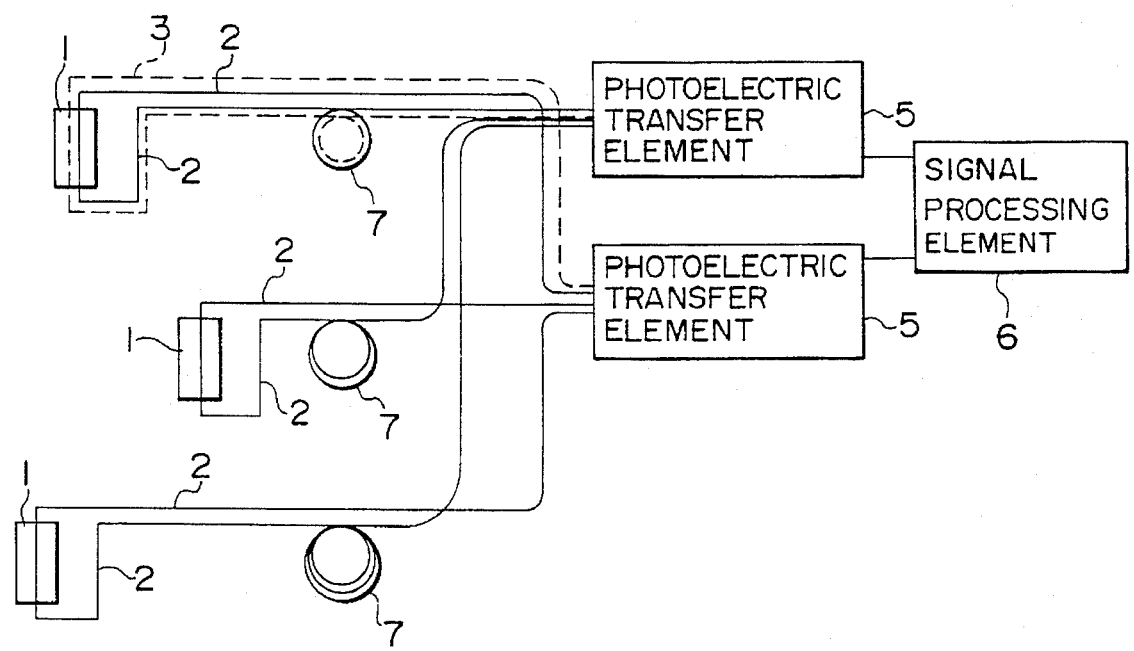
F I G. 6

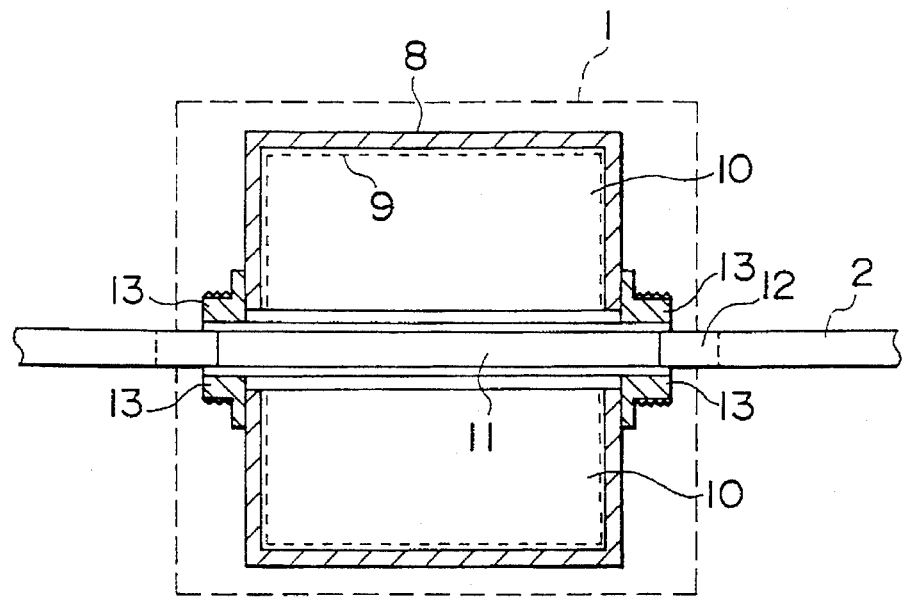
F I G. 9
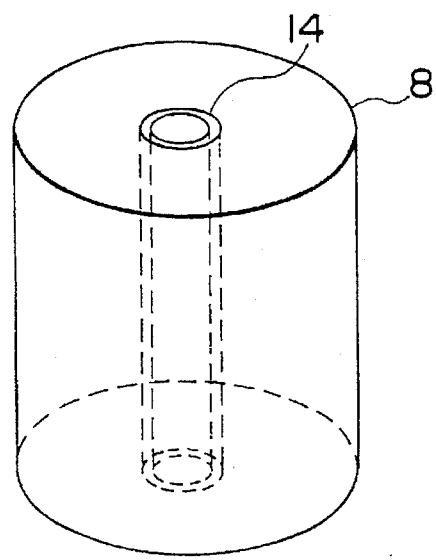
F I G. 10

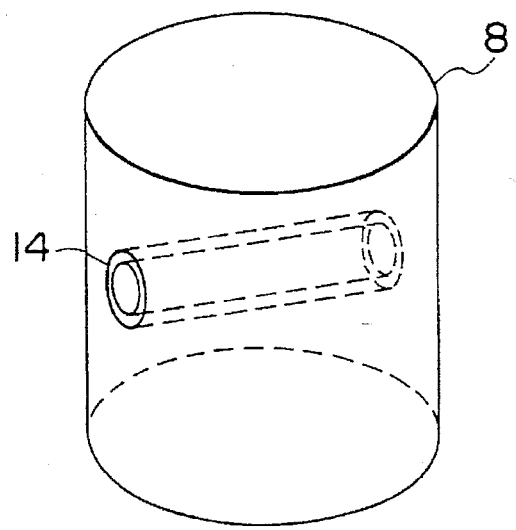
F I G. 11
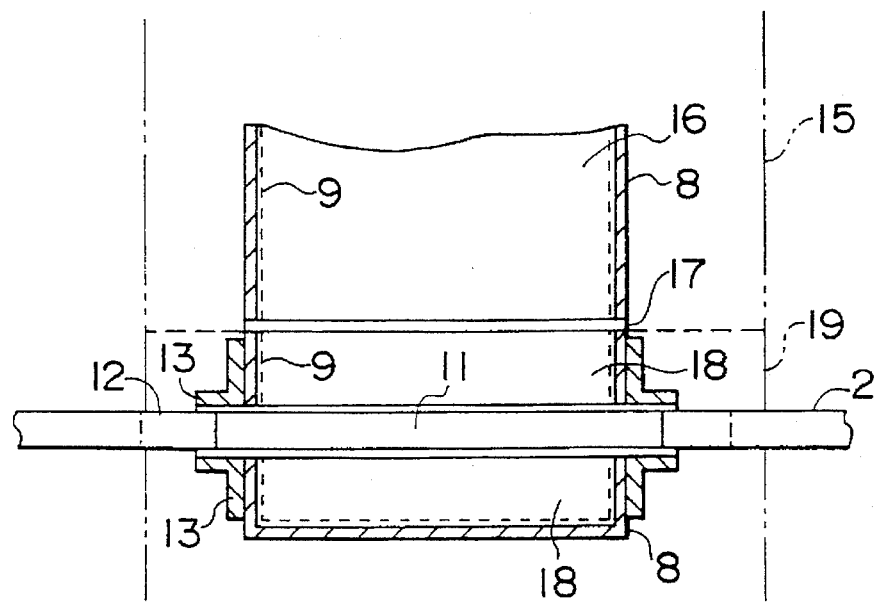
F I G. 12

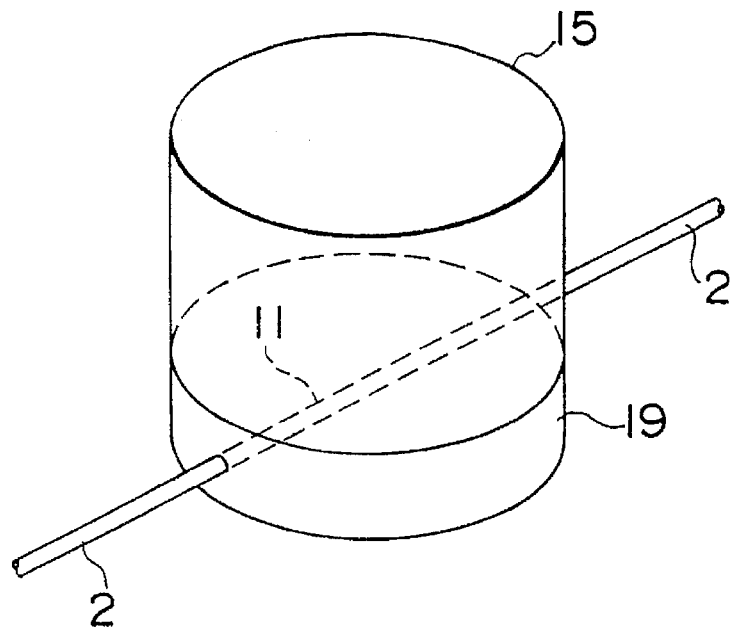
F I G. 13
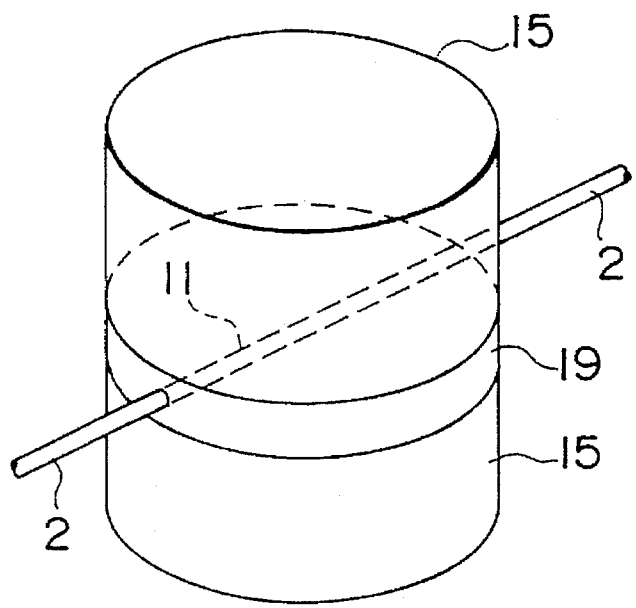
F I G. 14

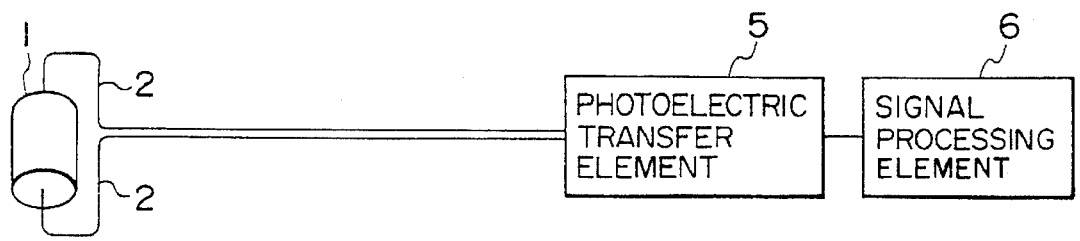
F I G. 15
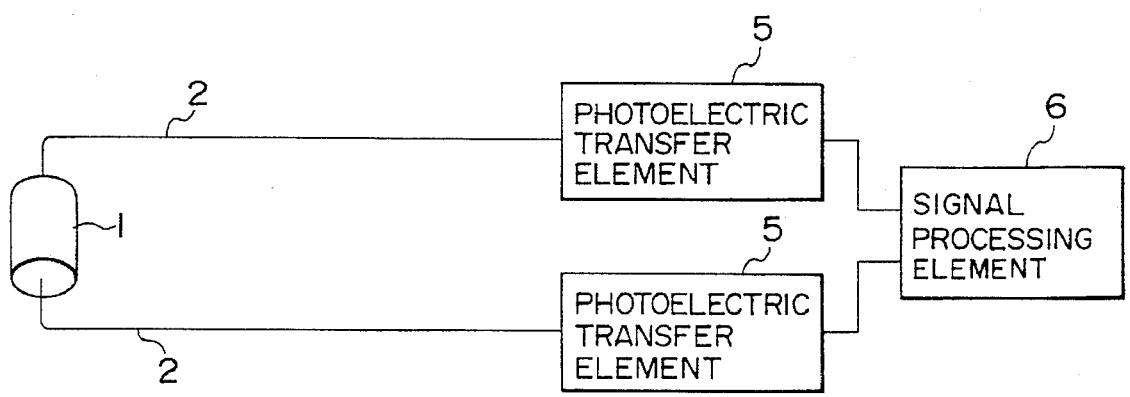
F I G. 16
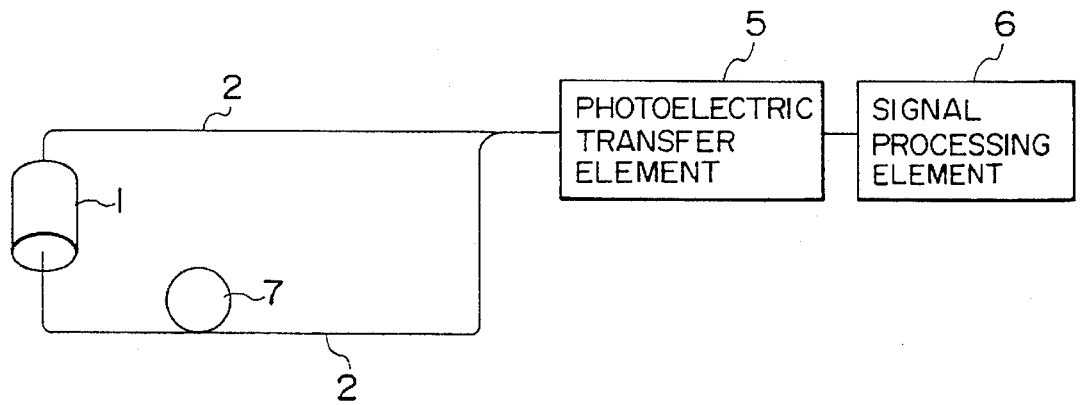
F I G. 17

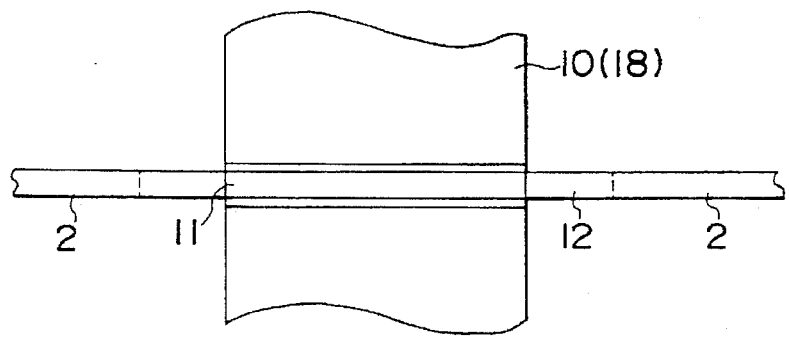
F I G. 18
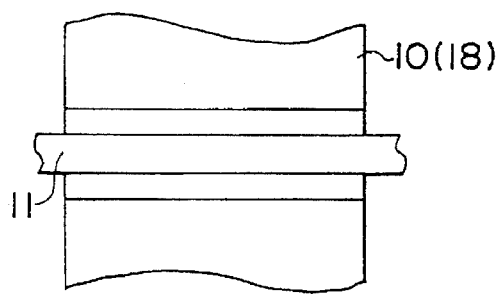
F I G. 19
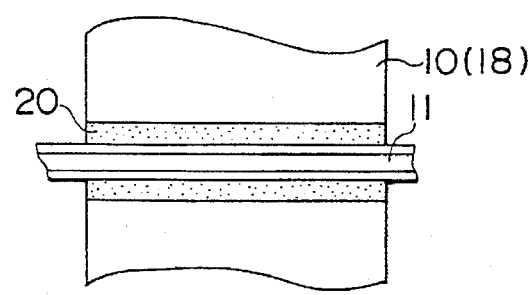
F I G. 20

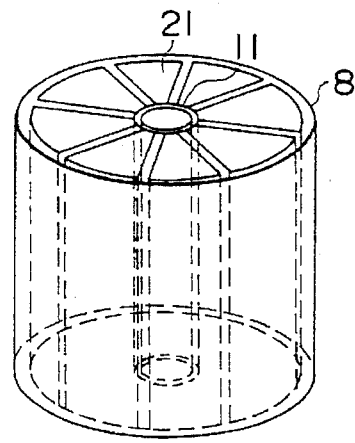
F I G. 21
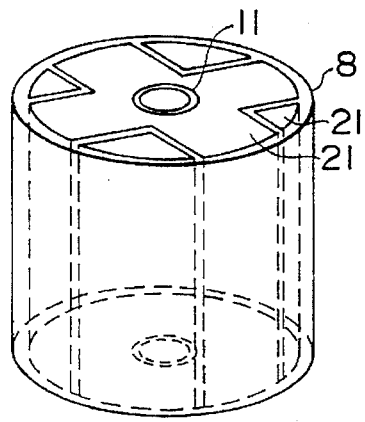
F I G. 22
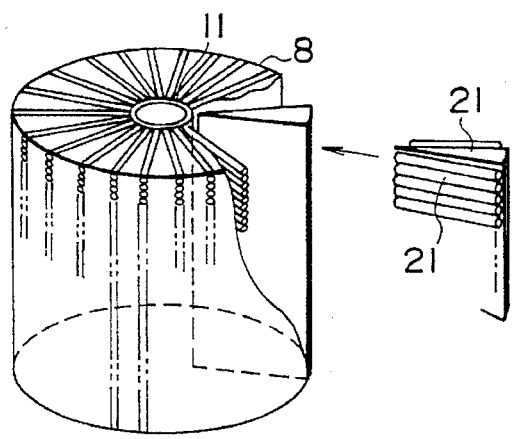
F I G. 23

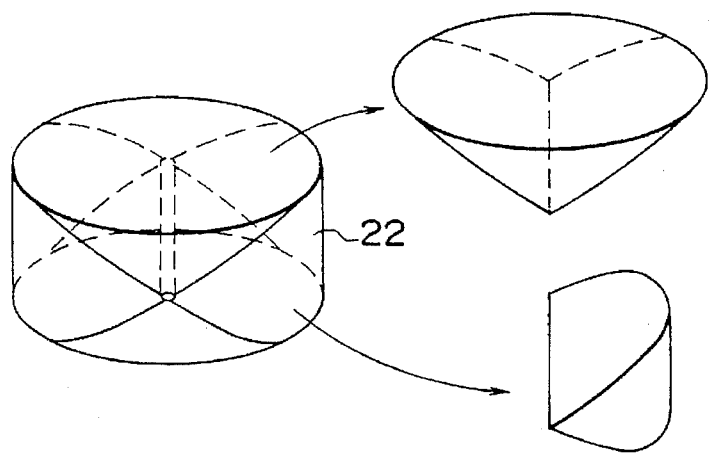
F I G. 24
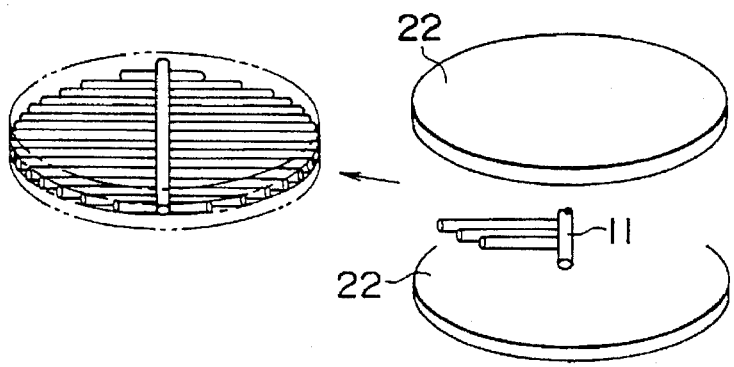
F I G. 25
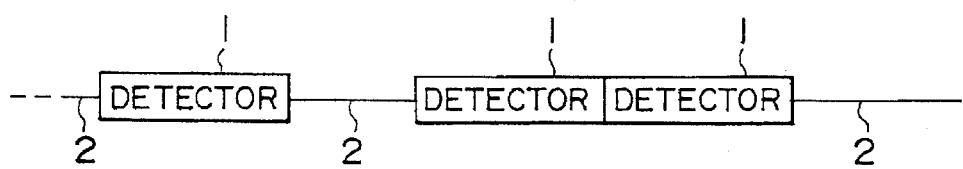
F I G. 26

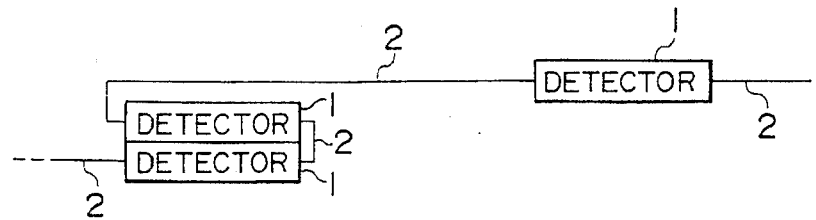
F I G. 27
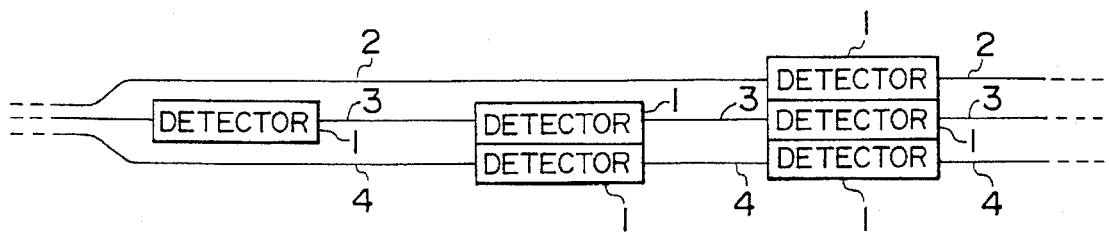
F I G. 28

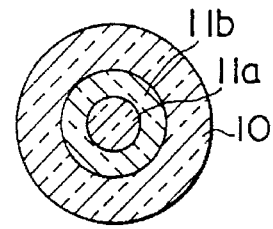
F I G. 30
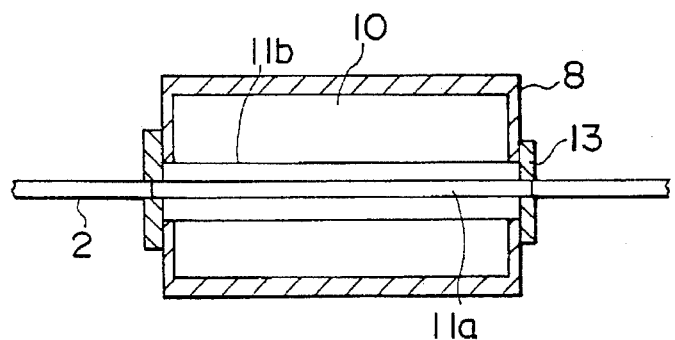
F I G. 31

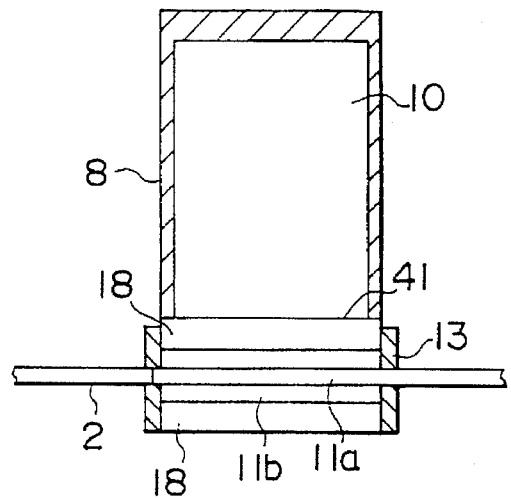
F I G. 33
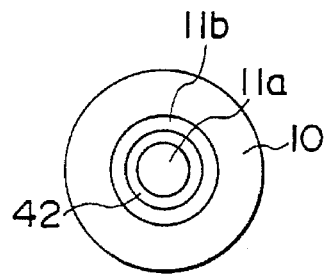
F I G. 34
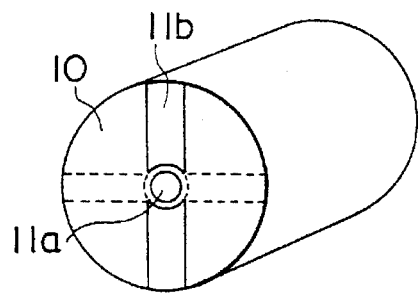
F I G. 35

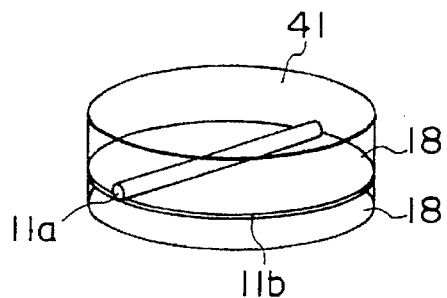
F I G. 36
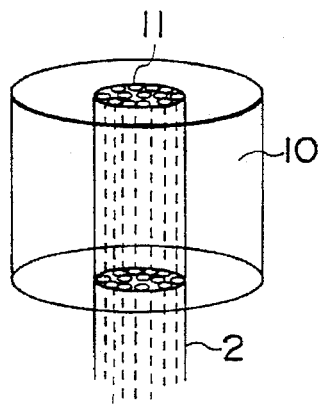
F I G. 37
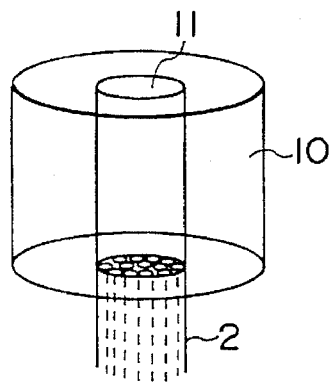
F I G. 38

RADIATION MEASURING SYSTEM HAVING SCINTILLATION DETECTORS COUPLED BY OPTICAL FIBERS FOR MULTIPOINT MEASUREMENT

BACKGROUND OF THE INVENTION

1. Field of the Invention

The present invention relates to a radiation measuring apparatus used in atomic energy facilities or the like, and capable of measuring radiation by means of few measuring devices without requiring use of power sources, electronic circuits, etc. in places of measurement, and of carrying out high-efficiency multipoint measurement at low cost.

2. Description of the Related Art

In atomic energy facilities including atomic power stations, stationary radiation detectors are installed in a minimum number of places where radiation measurement is required, and portable radiation detectors, survey meters, etc. are used as required in other places.

A stationary or portable radiation detector requires power a supply for detector biasing, preamplifier biasing, a signal transmitter circuit, etc., and besides, signal transmission cables, power cables, etc.

A portable survey meter, which may be of a chargeable type, must be carried by an operator in charge of radiation control or the like, thus requiring operations for reading and recording measured values during measurement. In a high-radiation atmosphere, moreover, the operator is in danger of nonnegligible exposure to radiation. This portable meter cannot enjoy a high operating efficiency on account of its itinerant service. Moreover, it is almost impossible to measure beforehand the level of radiation dose in a very-high-radiation area or restricted area.

Possibly, this problem may be solved by locating radiation measuring apparatuses in all necessary points of radiation measurement. If the points of measurement are increased, however, the measuring apparatuses, power units, signal transmission cables, power cables, etc. must be increased in proportion in number. Thus, incidental devices are increased, entailing increases in cost of construction and installation, as well as of operation and maintenance. In consequence, this method is hardly practicable.

In long-distance data transmission, electrical signals must be temporarily digitized or converted into light energy. Thus, electronic circuits are needed in various positions, so that there may be aroused problems of magnetic induction noises and ground loops which are attributable to ground potential differences, in some cases.

Since the electronic circuits are arranged in the vicinity of detectors, moreover, the reliability of the apparatuses is lowered by the irradiation effect of semiconductor devices in a very-high-radiation area. In many cases, therefore, the apparatuses cannot be used appropriately.

Accordingly, a method has been tried in which lights generated by the incidence of radiation are transmitted directly or indirectly to optical fibers by means of scintillators as detectors, without requiring use of power sources and electronic circuits in places of measurement. FIG. 39 shows a conventional scintillation detector 23 of a light transmission type used for detection. A scintillator 10 is covered by a reflector 9 and sealed in a housing 8. A fluorescent fiber 24 is embedded in the scintillator 10, and is fixed to an optical connector 13 which is mounted on one end of the scintillator 10. The optical connector 13 is fitted with an optical fiber (or a bundle of optical fibers) 2 which has a rod lens (collimator lens) 12 on its distal end. Fluorescences generated by the absorption of scintillation lights are transmitted through the optical fiber 2 to a photoelectric transfer element 5. In this stage, the fluorescences are converted into electrical signals and processed by means of a signal processing element 6.

The scintillation detector 23 of the light transmission type shown in FIG. 39 constitutes a measuring system which does not require use of electronic circuits and power sources in places of measurement, and will not be affected by magnetic induction noises. If the measuring system of FIG. 39 is used for measurement in a plurality of spots, however, it requires use of a plurality of photoelectric transfer elements 5 and signal processing elements 6. In this case, as shown in FIG. 40, a plurality of scintillation detectors 23 of the light transmission type are located in the individual places of measurement, and lights are transmitted from these places to the locations of measuring devices by means of the optical fibers 2 for transmission. The photoelectric transfer elements 5 and the signal processing elements 6 must be provided corresponding in number to necessary systems in these locations, and a large number of measuring devices are required in the places of measurement.

In the scintillation detector 23 shown in FIG. 39, moreover, the reflector 9 is located on one side of the fluorescent fiber 24. Since perfect specular reflection is difficult in practice, however, some of the generated fluorescences may be wasted- As a result, the signal-to-noise ratio of the system is lowered, so that the lower limit of energy of objects of measurement may be heightened in some cases.

FIG. 41 shows a radiation distribution measuring method using a scintillating fiber, developed as another measuring system of the light transmission type. The scintillating fiber 25 is laid out in a section for an object of measurement, and a photoelectric transfer element 5 is provided at each end of the fiber 25. Some modifications of this measuring method are proposed such that quartz fibers, which entail low optical attenuation, are joined together in use.

In the case where the object of measurement is the gamma-radiation distribution in atomic energy facilities or the like, for example, however, this measuring method involves various problems, such as low detecting efficiency, and cannot be easily put to practical use.

SUMMARY OF THE INVENTION

The present invention has been developed in consideration of these circumstances, and its object is to provide a radiation measuring apparatus capable of measuring radiation by means of few measuring devices without requiring use of power sources, electronic circuits, etc. in places of measurement, and of carrying out high-efficiency multipoint measurement at low cost.

In order to achieve the above object, a radiation measuring apparatus according to an aspect of the present invention comprises a plurality of scintillation detectors each having two light outlet ports through which lights are simultaneously emitted in accordance with the radiation received thereby, optical fibers for connecting the scintillation detectors in series at the outlet ports and transmitting the lights emitted from the scintillation detectors through the outlet ports, photoelectric transfer means for converting the lights transmitted through the optical fibers into electrical signals, and signal processing means for processing the electrical signals, thereby measuring the radiation.

A radiation measuring apparatus according to another aspect of the invention comprises a plurality of scintillation detectors each having two light outlet ports through which lights are simultaneously emitted in accordance with the radiation received thereby, a plurality of optical fibers for connecting the scintillation detectors in parallel at the outlet ports and transmitting the lights emitted from the scintillation detectors through the outlet ports, photoelectric transfer means for converting the lights transmitted individually through the optical fibers into electrical signals, and signal processing means for processing the electrical signals, thereby measuring the radiation.

A radiation measuring apparatus according to still another aspect of the invention comprises a plurality of scintillation detectors each having two light outlet ports through which lights are simultaneously emitted in accordance with the radiation received thereby, optical fibers connected to the scintillation detectors and adapted to transmit the lights emitted through the outlet ports, photoelectric transfer means for converting the lights transmitted through the optical fibers into electrical signals, and signal processing means for processing the electrical signals, thereby measuring the radiation, each of the scintillation detectors including a scintillator for emitting a scintillation light in accordance with the radiation received thereby, and a wavelength shifter located in optical contact with the scintillator and adapted to absorb the scintillation light, emit a fluorescence corresponding thereto and lead the fluorescence to both ends thereof so that the fluorescence is transmitted to the photoelectric transfer means through the two light outlet ports and the optical fibers communicated therewith, and to allow a fluorescence transmitted from another scintillation detector through the optical fibers to pass.

A radiation measuring apparatus according to a further aspect of the invention comprises a scintillation detector including a scintillator adapted to emit a light in response to the incidence of radiation and a wavelength shifter for absorbing the emitted light and emitting a light with a longer wavelength, and measures the radiation in accordance with the emitted lights, the wavelength shifter being in optical contact with another wavelength shifter, which is in optical contact with the scintillator.

A radiation measuring apparatus according to an additional aspect of the invention comprises a scintillation detector including a scintillator adapted to emit a light in response to incidence of radiation and a wavelength shifter for absorbing the emitted light and emitting a light with a longer wavelength, and measures the radiation in accordance with the emitted lights, the scintillator having a transparent medium fitted on the end face thereof, the wavelength shifter being in optical contact with another wavelength shifter, which is in optical contact with the transparent medium.

In an arrangement according to the present invention, as described above, each scintillation detector is provided with two light outlet ports, and a plurality of scintillation detectors are connected in series with one another at each outlet port. Accordingly, radiation can be measured by means of few measuring devices without being influenced by noises and without requiring use of power sources, electronic circuits, etc. in places of measurement. Moreover, high-efficiency multipoint measurement can be carried out at low cost.

In another arrangement, each scintillation detector is provided with two light outlet ports, and a plurality of scintillation detectors are connected in parallel with one another at each outlet port. Also in this case, radiation can be measured by means of few measuring devices without being influenced by noises and without using power sources, electronic circuits, etc. in places of measurement. Moreover, high-efficiency multipoint measurement can be carried out at low cost.

According to still another arrangement, the wavelength shifter itself serves as a light guide, so that lights generated in the wavelength shifter are delivered substantially simultaneously to the optical fibers at the opposite ends of the shifter. At the same time, lights generated in another scintillation detector are landed on one end of the wavelength shifter from the optical fiber side, propagated to the other end through the wavelength shifter as the light guide, and emitted again to the other optical fiber side.

According to a further arrangement, one wavelength shifter has a function to transmit incident light from one end face thereof to the other, and another wavelength shifter is provided additionally. Accordingly, light beams of wavelengths capable of propagation in the wavelength shifters can be externally introduced as oblique light beams. Thus, the light condensing efficiency can be improved, so that the signal-to-noise ratio of the detectors can be heightened.

BRIEF DESCRIPTION OF THE DRAWINGS

FIG. 1 is a diagram showing an arrangement of a multipoint measuring system of a series-connected single type;

FIG. 2 is a diagram showing an arrangement of a multipoint measuring system of a series-connected multiplex type;

FIG. 5 is a diagram showing an arrangement of a multipoint measuring system of a parallel-connected single type;

FIG. 6 is a diagram showing an arrangement of a multipoint measuring system of a parallel-connected multiplex type;

FIG. 9 is a view showing an arrangement of a scintillation detector of a light-guide type;

FIG. 10 is a perspective view showing a housing and a tubular optical window of a light-guide-type scintillation detector;

FIG. 11 is a perspective view showing a housing and a tubular optical window of another light-guide-type scintillation detector;

FIG. 12 is a view showing an arrangement of a light-guide-type scintillation detector furnished with a light buffer;

FIG. 13 is a perspective view showing a first example of a columnar scintillator and light buffer;

FIG. 14 is a perspective view showing a second example of the columnar scintillator and light buffer;

FIG. 15 is a diagram showing an example of a measuring apparatus in which two optical fibers are connected to a common photoelectric transfer device in the case where a light-guide-type scintillation detector is used for single measurement, not multipoint measurement;

FIG. 16 is a diagram showing an example of a measuring apparatus in which two optical fibers are connected individually to two photoelectric transfer devices in the case where the light-guide-type scintillation detector is used for single measurement;

FIG. 17 is a diagram showing an example of a measuring apparatus in which two optical fibers are connected to a common photoelectric transfer device and an optical delay portion is provided in the case where the light-guide-type scintillation detector is used for single measurement;

FIG. 18 is a view showing a wavelength shifter of the scintillation detector;

FIG. 19 is an enlarged view of the wavelength shifter of FIG. 18;

FIG. 20 is an enlarged view of the wavelength shifter filled with optical grease or the like;

FIG. 21 is a perspective view showing a first example of a divided scintillator;

FIG. 22 is a perspective view showing a second example of the divided scintillator;

FIG. 23 is a perspective view showing a third example of the divided scintillator;

FIG. 24 is an exploded perspective view showing a first example of a divided light buffer;

FIG. 25 is an exploded perspective view showing a second example of the divided light buffer;

FIG. 26 is a diagram illustrating a first example of a method for adjusting the detecting efficiency;

FIG. 27 is a diagram illustrating a second example of the method for adjusting the detecting efficiency;

FIG. 28 is a diagram illustrating a third example of the method for adjusting the detecting efficiency;

FIG. 30 is a sectional view of the scintillator and wavelength shifter shown in FIG. 29;

FIG. 31 is a view showing the scintillation detector of FIG. 29;

FIG. 33 is a view showing the scintillation detector of FIG. 32;

FIG. 34 is a plan view showing a scintillator and wavelength shifter of a light-guide-type scintillation detector of still another basic configuration;

FIG. 35 is a perspective view showing a center-guide-type scintillator and wavelength shifter of a light-guide-type scintillation detector of a further basic configuration;

FIG. 36 is a perspective view showing an end-guide-type scintillator, wavelength shifter, and transparent medium of a light-guide-type scintillation detector of another basic configuration;

FIG. 37 is a perspective view showing an example of the scintillator and wavelength shifter;

FIG. 38 is a perspective view showing another example of the scintillator and wavelength shifter;

DETAILED DESCRIPTION OF THE PREFERRED EMBODIMENTS

Figure 3:
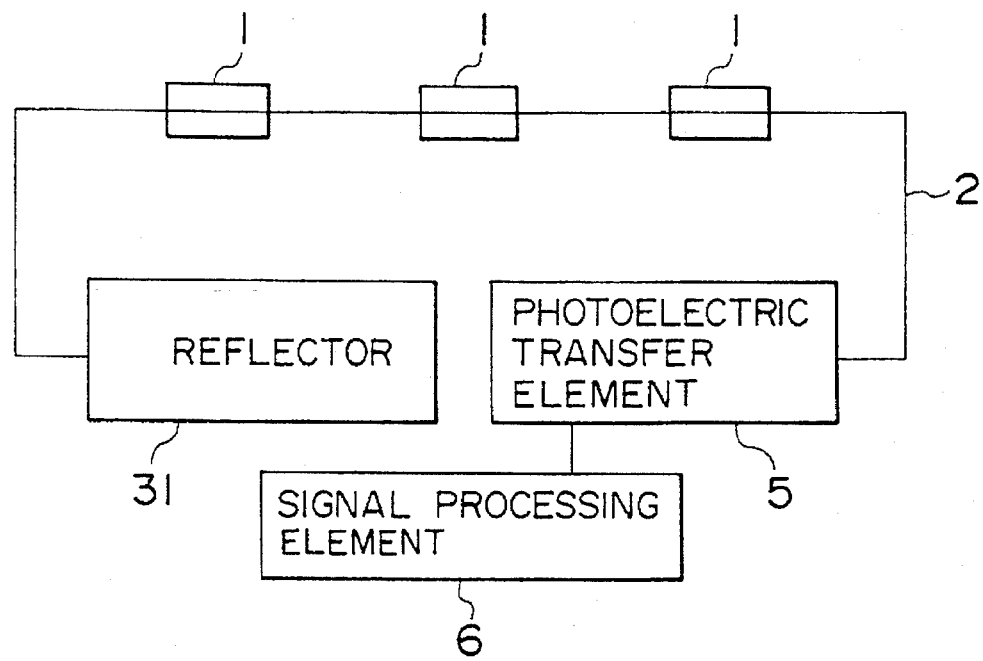
FIG. 3 is a diagram showing the series-connected single type based on a one-way arrival time and light volume difference method.

Multipoint radiation measuring apparatuses according to the embodiments of the present invention will now be described in detail with reference to the drawings.

FIG. 1 shows a multipoint measuring system of a series-connected single type. A group of light-guide-type scintillation detectors 1 are connected in series like a chain by means of a group of divided first optical fibers 2, thus forming a ring as a whole. Photoelectric transfer elements 5 are provided individually at the opposite ends of the first optical fiber group 2. Lights are converted into electrical signals by means of these photoelectric transfer elements 5, and are processed by means of a signal processing element 6.

In this embodiment, two light outlet ports are provided at the opposite ends of each of a plurality of scintillation detectors 1. The detectors 1 are connected like a chain by means of the first optical fiber group 2. The light-guide-type scintillation detectors 1 deliver lights therefrom to the light outlet ports at the opposite ends thereof. External incident lights are propagated to a light outlet port at another end.

Thus, radiation can be measured by means of few measuring devices without requiring use of power sources, electronic circuits, etc. in places of measurement, and high-efficiency multipoint measurement can be carried out at low cost.

In the series-connected single type described above, each light-guide-type scintillation detector 1 has two outlet ports (one set) at the opposite ends thereof. In this series-connected multiplex type, however, each light-guide-type scintillation detector 1 has a plurality of sets of light outlet ports at the opposite ends thereof. As shown in FIG. 2, a plurality of scintillation detectors 1 are connected in series like a chain by means of first, second, and third optical fiber groups 2, 3 and 4. In the example shown in FIG. 2, three rings are formed in total. The photoelectric transfer elements 5 are provided individually at the opposite ends of the first, second, and third optical fiber groups 2, 3 and 4.

Since the first, second, and third optical fiber groups 2, 3 and 4 form rings which are independent of one another, signals propagated through the optical fibers cannot be intermingled. More specifically, a signal being propagated through the first optical fiber group 2 can never be propagated through the second or third optical fiber group 3 or 4 in any section.

According to this embodiment arranged in this manner, the magnitude of optical pulses or light volume, obtained in response to the incidence of one radiation, can be increased.

In the cases of the multipoint measuring systems of the series-connected single type and the series-connected multiplex type, optical pulses emitted from one light-guide-type scintillation detector 1 are delivered from the opposite end portions, and a delay of the propagation time and optical attenuation are caused as the pulses pass through optical paths to the photoelectric transfer elements 5 and the scintillation detectors 1. Since the positions of the scintillation detectors in the regions where radiation is sensed are dispersed, "dislocation" which is involved in distribution measurement by means of scintillating fibers rarely occurs.

In the embodiment shown in FIG. 1 or 2, identifying means is provided which identifies the scintillation detector 1 as a source of optical pulses in the following manner. Optical pulses which are generated in response to one phenomenon caused by the incidence of radiation upon the scintillation detectors 1 and are delivered from the opposite ends of the detectors 1 are received by means of the photoelectric transfer elements 5, and the difference of arrival time or light volume between the two optical pulses is measured. The identification is made on the basis of this difference. In the case where the difference of the light volume is used for the identification, the position of the light-guide-type scintillation detector 1 as the source of pulses is identified by shaping and converting the optical pulses into a light volume or pulse wave height.

Figure 4:
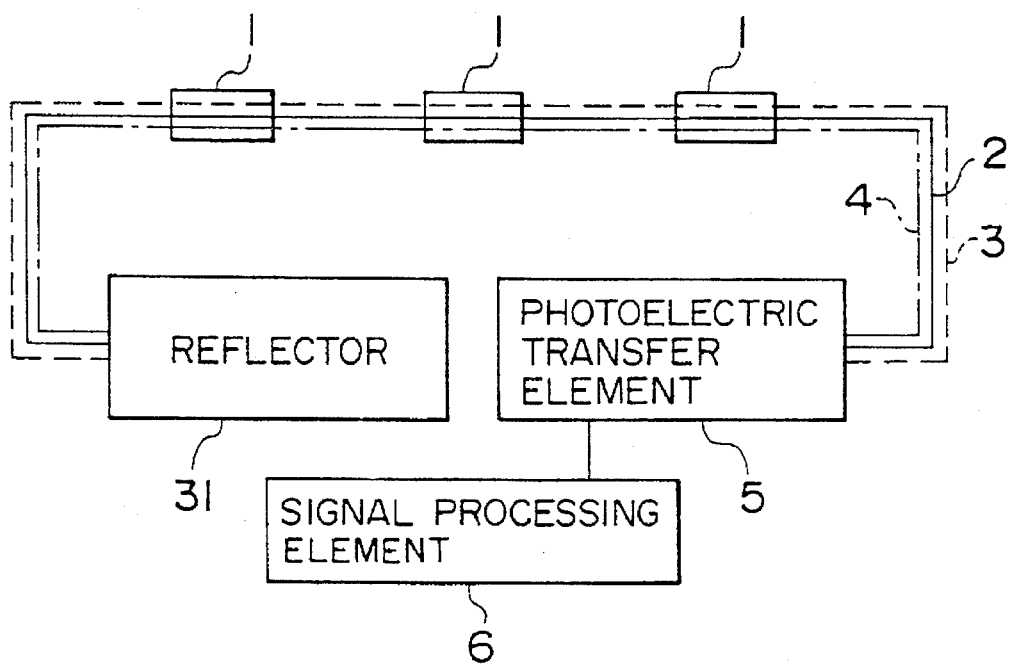
FIG. 4 is a diagram showing the series-connected multiplex type based on the one-way arrival time and light volume difference method.

In the embodiment shown in FIG. 3 or 4, a reflector 31 is provided in place of one of the photoelectric transfer elements 5. According to this arrangement, a signal having reached the reflector 31 returns to the photoelectric transfer element 5 at the other end by reversely passing through a first optical fiber group 2 in the case of the single type, as shown in FIG. 3, or by reversely passing through first, second, and third optical fiber groups 2, 3 and 4 in the case of the multiplex type, as shown in FIG. 4.

Also in this case, optical pulses delivered from one specific light-guide-type scintillation detector 1 are subject to a delay of the propagation time and optical attenuation which are caused as the pulses pass through the optical paths to the photoelectric transfer elements 5 and the scintillation detectors 1.

According to this embodiment, identifying means is provided which identifies the scintillation detector 1 as a source of optical pulses in the following manner. Optical pulses which are generated in response to one phenomenon caused by the incidence of radiation upon the scintillation detectors 1 and are delivered from one end of each detector 1 and optical pulses which are delivered from the other end of each detector 1 and reflected by the reflector 31 to pass reversely through the detectors 1 and the optical fibers 2 are received by means of the photoelectric transfer element 5, and the difference of arrival time or light volume between the two optical pulses is measured. The identification is made on the basis of this difference. In the case where the difference of the light volume is used for the identification, the position of the light-guide-type scintillation detector 1 as the source of pulses is identified by shaping and converting the optical pulses into a light volume or pulse wave height.

In the case where the points of measurement for multipoint measurement are situated in quite different positions such that there are different distances, directions, and paths, the aforementioned series-connected type sometimes may suffer trouble or waste associated with the arrangement of the optical fibers. In such a case, a multipoint measuring system of a parallel-connected type, such as the one shown in FIG. 5, is available.

In this multipoint measuring system of the parallel-connected single type, as shown in FIG. 5, a plurality of light-guide-type scintillation detectors 1 are arranged in various places, and lights delivered from the opposite ends of each scintillation detector 1 are guided to a pair of photoelectric transfer elements 5 by means of two first optical fibers 2. The output of each photoelectric transfer element 5 is processed by means of a signal processing element 6.

In connection with the distance of transmission by means of the first optical fibers, there is a difference between the respective lengths of the two first optical fiber groups 2 which are connected to each light-guide-type scintillation detector 1. The difference between the lengths of the first optical fiber groups 2 is equal to the difference in the optical path length, and is given as optical delay portions 7 in FIG. 5. The transmission distance can be adjusted by means of other optical delay elements or the like as well as by means of a delay caused by the difference in the fiber length.

The position of the scintillation detector 1 as a source of optical pulses is identified by optionally setting the values of the delay times of the optical delay portions 7 within a range such that the output can be processed by means of the signal processing element 6. Thus, the position can be identified by only the delay time of the optical delay portion 7 which is associated with the scintillation detector 1 concerned, without regard to the distance from the photoelectric transfer elements 5. If the optical delay portion 7 is subject to the effect of optical attenuation, the position can be identified in accordance with the aforementioned light volume difference.

Also in a multipoint measuring system of a parallel-connected multiplex type, each light-guide-type scintillation detector 1 may be connected with two sets of optical fibers or more as well as with one set. In FIG. 6, a broken line represents a second optical fiber 3 of a second set which is connected a light-guide-type scintillation detector 1. According to this embodiment arranged in this manner, the magnitude of optical pulses obtained in response to the incidence of one radiation, that is, light volume, can be increased.

In the embodiment shown in FIG. 5 or 6, identifying means is provided which identifies the scintillation detector 1 as a source of optical pulses in the following manner. The times of propagation from a plurality of scintillation detectors 1 are set at different values based on a propagation time difference which is attributable to the difference in length between two optical fibers connected to each scintillation detector 1, and the identification is made on the basis of the difference of arrival time or light volume between the two optical pulses which is detected by means of the pair of photoelectric transfer elements 5. In the case where the difference of the light volume is used for the identification, the position of the light-guide-type scintillation detector 1 as the source of pulses is identified by shaping and converting the optical pulses into a light volume or pulse wave height.

Figure 7:
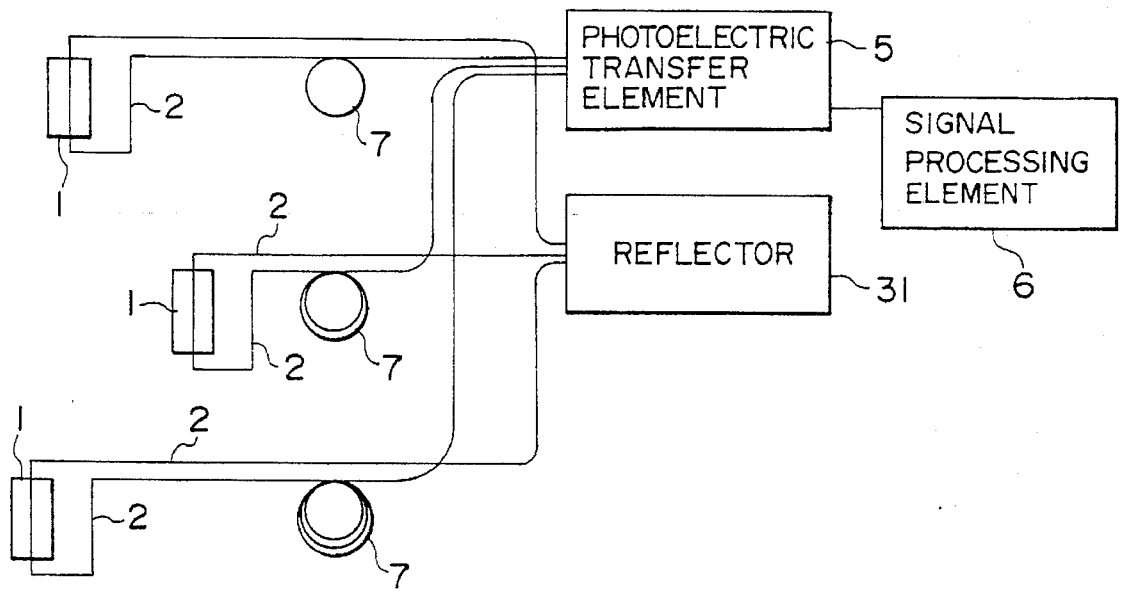
FIG. 7 is a diagram showing the parallel-connected single type based on the one-way arrival time and light volume difference method.
Figure 8:
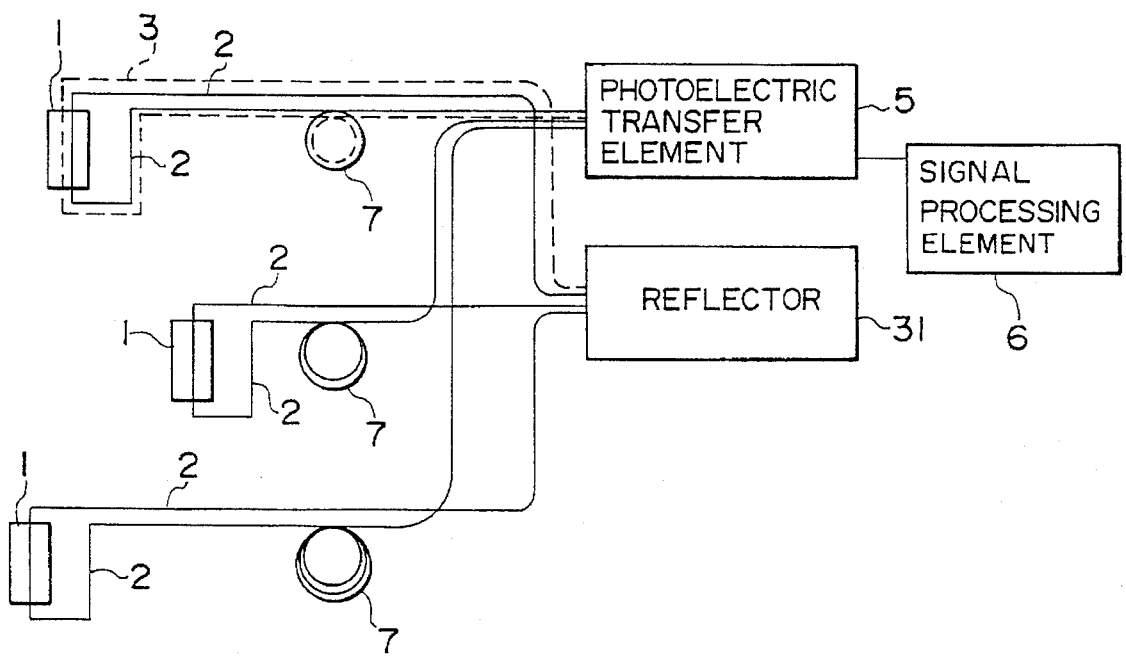
FIG. 8 is a diagram showing the parallel-connected multiplex type based on the one-way arrival time and light volume difference method.

In the embodiment shown in FIG. 7 or 8, a reflector 31 is provided in place of one of the photoelectric transfer elements 5. According to this arrangement, a signal having reached the reflector 31 returns to the photoelectric transfer element 5 at the other end by reversely passing through a first optical fiber group 2 in the case of FIG. 7, or by reversely passing through first and second optical fiber groups 2 and 3 and a third optical fiber group (not shown) in the case of FIG. 8.

According to this embodiment, identifying means is provided which identifies the scintillation detector 1 as a source of optical pulses in the following manner. Optical pulses which are generated in response to one phenomenon caused by the incidence of radiation upon the scintillation detectors 1 and are delivered from one end of each detector 1 and optical pulses which are delivered from the other end of each detector 1 and reflected by the reflector 31 to pass reversely through the detectors 1 and the optical fibers are received by means of the photoelectric transfer element 5, and the difference of arrival time or light volume between the two optical pulses is measured. The identification is made on the basis of this difference. In the case where the difference of the light volume is used for the identification, the position of the light-guide-type scintillation detector 1 as the source of pulses is identified by shaping and converting the optical pulses into a light volume or pulse wave height.

A plurality of photoelectric transfer elements 5 are provided for a multipoint measuring system, and a plurality of optical filters for waveband selection are arranged in front of the transfer elements 5.

Identifying means for a scintillation detector 1 as a source of optical pulses is provided for use with the optical filters and the photoelectric transfer elements 5. The respective emission center wavelengths of scintillation detectors 1 are previously differentiated for the case of scintillation light transmission. For fluorescent transmission, the respective emission center wavelengths of fluorescent substances used for light condensing are differentiated in advance. After doing this, the scintillation detector 1 as the pulse source can be identified according to the wavelength difference, without depending on the difference of arrival time or light volume. Thus, the position of the source scintillation detector 1 can be identified without increasing the cable size, although the photoelectric transfer elements 5 are increased in size.

As described above, the position of the source scintillation detector 1 can be identified from the difference of arrival time or light volume between optical pulses. If the radiation dose of the atmosphere in the place of measurement where the multipoint measuring system is located increases, however, optical pulses delivered from a plurality of scintillation detectors 1 are brought close to one another and superposed, so that an incidental wrong counting operation is liable to be caused. In order to complement both of two pieces of information on the differences in arrival time and light volume, in this case, a correction method 1 is proposed according to this embodiment.

More specifically, signal error detecting means is provided which does not count the two optical pulse sets, concluding that the pulse sets are not from the same scintillation detector 1, if there is a difference greater than a predetermined value between a light volume difference estimated from optical paths from the source of optical pulses to the photoelectric transfer elements 5 and a measured light volume difference, with respect to position information identified from the information on the pulse arrival time difference, in identifying the source of pulses. In the case where the wave height value of one optical pulse, out of two consecutive ones, which is detected next to the other is greater than that of the preceding one, for example, the pulses will not be counted as it is concluded that there is some abnormal situation related to the optical path length. According to this embodiment, therefore, incidental counting in such a situation can be avoided.

According to the wave selection method, the number of photoelectric transfer elements 5 increases, although the number of cables does not. However, the probability of incidental counting in the system lowers, so that the reliability of the system is improved. In practice, if one center wavelength involves a plurality of scintillation detectors, or if it is difficult to separate or discriminate wavelengths because the wavelengths cannot be selected or are located close to one another, or suitable optical filters are not available, then the wavelengths cannot be subdivided in an optional number and selected. Thus, the wavelengths are classified into several groups. In this case, the wavelengths of a specific group can be corrected by means of the aforesaid identifying means based on the difference of arrival time or light volume, or by using both the differences in arrival time and light volume described in connection with the correction method 1.

FIG. 9 shows the basic configuration of a light-guide-type scintillation detector 1 for multipoint measurement. A first optical fiber 2 is connected to each end of a housing 8 by means of an optical connector 13. Inside the housing 8, a reflector 9 is provided between the housing 8 and a scintillator portion 10. A wavelength shifter (fluorescent substance) 11 penetrates the center of the scintillator portion 10, and is in intimate optical contact with end faces of the first optical fiber 2.

The wavelength shifter 11 penetrates the system, and a light is delivered from each end thereof. This is because optical pulses delivered from the opposite ends of each light-guide-type scintillation detector 1 for one phenomenon caused by the incidence of radiation must maintain simultaneity in order to effect multipoint measurement by utilizing the differences of the light propagation time and light volume. It is also advisable to take out lights at the opposite ends of the wavelength shifter 11 in order to distribute generated fluorescences equally and utilize them efficiently. Since a plurality of optical fiber cores can be put together into one cable, moreover, the length and number of cables to be laid out need not be doubled in order to fetch the light from each end of the shifter 11.

In the case of parallel connection, it is necessary only to fetch lights from the light-guide-type scintillation detector 1, and the lights from the detector 1 need not be passed, so that use of rod lenses 12 is effective. In the case of multipoint measurement of the series-connected type, however, optical pulses delivered from other light-guide-type scintillation detectors 1 must be passed and propagated, and the rod lenses 12 are unnecessary. In consideration of light condensing, furthermore, it is appropriate to equalize the respective diameters of the optical fibers which are connected to the core portion of the wavelength shifter.

In order to fulfill these requirements, the wavelength shifter (fluorescent substance) 11 must penetrate the system. In this arrangement, lights can get into and out of the shifter 11 through the opposite ends thereof, and the shifter 11 serves as an apparently continuous light guide when it is connected with the second optical fibers 2.

Since the fluorescent substance itself serves as a light guide, fluorescent pulses which are emitted as the fluorescent substance absorbs scintillation lights are distributed substantially simultaneously and equally to the opposite ends of the fluorescent substance, and delivered to the optical fiber side. At the same time, optical pulses generated from another scintillation detector are landed on one end of the fluorescent substance from the optical fiber side, propagated to the other end through the fluorescent substance as the light guide, and emitted again to the optical fiber side.

In the case where a plurality of sets of optical fibers are connected, as in the case of the multipoint measuring system of the series-connected multiplex type, connection of the optical fibers is achieved not by increasing the diameter of wavelength shifters (fluorescent substances) 11 but by increasing the size of a through hole in each scintillation detector 1 and the number of wavelength shifters. In the case of the multipoint measuring system of the parallel-connected multiplex type, connection of a plurality of sets of optical fibers is achieved by increasing the number of wavelength shifters or the diameter of each shifter.

This is because the bundle-type optical fibers and the large-diameter wavelength shifter cannot constitute a continuous light guide for multipoint measurement.

Although thick wavelength shifters are available, in general, optical fibers are limited in thickness in consideration of the bending radius and uniformity.

The core packing of the cross section of a bundle-type optical fiber is scores of percents at the highest, and gaps are formed between the cores. Even though the first optical fibers 2 are connected to the opposite ends of the wavelength shifter 11, therefore, the resulting structure cannot be an entire light guide. Some of lights which enter the wavelength shifter 11 through the one first optical fiber 2 and get out into the other first optical fiber 2 are lost in the gaps.

When plastic scintillators, nondeliquescent inorganic scintillators, or ceramic scintillators are used in the system, they need not be completely sealed or cut off from air.

When liquid scintillators or deliquescent scintillators are used in the system, however, they must be kept in a sealed state for a long period of time in order to maintain their reliability.

If a wavelength shifter (fluorescent substance) 11, which is inserted in a through hole in a scintillator portion 10, is attached to optical connectors 13, in this situation, it is difficult to cut off the scintillator portion 10 from air or seal it completely. This is because the wavelength shifter 11, whose material is based on a resin, cannot be fused to a housing 8. In such a case, fusion to the housing 8 can be achieved by inserting a tubular optical window 14, formed of quartz glass or other optical glass material, close into the through hole, as shown in FIG. 10 or 11, and inserting the wavelength shifter 11 into the optical window 14. With this arrangement, the scintillators can enjoy prolonged stability and improved reliability.

In the case of an ordinary columnar scintillator, the through hole may formed so as to extend in the direction of the axis of the column, as shown in FIG. 10. If necessary, however, the through hole may be formed extending in the transverse direction, as shown in FIG. 11. Preferably, the scintillator material and the tubular optical window 14 should have as close refractive indexes as possible.

FIG. 12 shows the basic configuration of a light-guide-type scintillation detector capable of using a standard columnar scintillator 15 which is prescribed by the Japanese Industrial Standards (JIS). This detector shares the principle with the light-guide-type scintillation detector shown in FIG. 9. However, the former differs a little from the latter in that the columnar scintillator 15 is stacked on an optical buffer 19, as is also shown in FIG. 13. In the optical buffer 19, a transparent medium (optical pipe portion) 18, which serves as an optical pipe, extends from a laminar optical window 17 of the scintillator 15, and is covered by a reflector 9. The reflector 9 is covered by a housing 8. A wavelength shifter 11 is inserted in a through hole which is bored in the transparent medium, and is connected to first optical fibers 2 by means of optical connectors Preferably, according to this embodiment, a scintillator crystal 16, the laminar optical window 17, and the transparent medium (optical pipe portion) 18 of the optical buffer 19 have equal refractive indexes, and their respective joint surfaces are fully intimately in contact with one another. In this embodiment, lights generated in the scintillator crystal 16 equally penetrate the transparent medium 18, and are absorbed by the wavelength shifter 11 with a predetermined probability. Fluorescences emitted at that time are transmitted to the first optical fibers 2.

The use of the JIS-based columnar scintillator 15 ensures high achievements and reliability in the manufacture of the scintillator itself, low cost, satisfactory detecting efficiency and direction/energy dependence of the scintillation detector, etc.

In the embodiment shown in FIG. 14, two columnar scintillators 15 are stacked individually on the upper and lower surfaces of one optical buffer 19. Thus, the radiation detecting efficiency is improved.

In the case where the light-guide-type scintillation detector 1 shown in FIG. 9 or 12, in which a light can be fetched from each end of the wavelength shifter 11 which penetrates the system, is used for one-point measurement, not for multipoint measurement, a reflector is attached to a light outlet port at one end of the detector 1. Thus, the detector 1 can be used in the same manner as the conventional scintillation detector 23 of the light transmission type.

When the light-guide-type scintillation detector 1 is used for one-point measurement, not for multipoint measurement, lights from light outlet ports at the opposite ends of the detector 1 are guided to a common photoelectric transfer element 5 by means of first optical fibers 2, and are processed by means of a signal processing element 6, as shown in FIG. 15. Thus, fluorescences generated in the wavelength shifter 11 in the detector 1 and delivered to both ends of the detector 1 can be efficiently guided to the transfer element 5.

In the case where the reflector is attached to the light outlet port at the one end of the detector, as described above, it is difficult to achieve perfect specular reflection, so that some optical loss cannot be avoided. Since the lights are received at both ends of the detector 1 according to this embodiment, however, the light volume of signals can be increased.

When the light-guide-type scintillation detector 1 is used for one-point measurement, not for multipoint measurement, lights from the opposite ends of the detector 1 are guided to a pair of photoelectric transfer elements 5 by means of two first optical fibers 2, individually, and are counted simultaneously. According to this arrangement, random noise components which are produced in the photoelectric transfer elements can be reduced. If there is a difference in length between the two first optical fibers 2, the same simultaneous counting method can be used by effecting delay time correction in consideration of this difference.

FIG. 17 shows a case in which lights are guided from both ends of a detector 1 to a single photoelectric transfer element 5. An optical delay portion 7 is provided such that two signals are counted with a delay. More specifically, optical pulses whose light volume differences correspond only to losses to which they are subject as they pass through the delay portion 7 are counted as true signals only when their arrival is within an expected delay time.

Thus, in detecting the optical pulses at the opposite ends of the scintillation detector by means of separate photoelectric transfer elements 5, simultaneous counting is carried out such that only simultaneously detected signals are regarded as significant optical pulses. In the case where there is a difference in wavelength between the lights from the opposite ends of the scintillation detector, simultaneous counting is carried out after correcting a time lag. Those signals which cannot enjoy simultaneity are regarded as noise components generated from the photoelectric transfer elements 5, and are not counted. Thus, the effective signal-to-noise ratio is improved.

In the wavelength shifter 11 used in the light-guide-type scintillation detector 1, as shown in FIG. 19, glass or resin containing a fluorescent substance which has an absorption spectrum conformable to the spectrum of scintillation lights is processed into a column which is adapted for use with optical fibers, and its whole surface is optically polished. In this embodiment, the wavelength shifter 11 must serve as an optical pipe for light propagation based on total reflection. As shown in the enlarged view of FIG. 19, therefore, it is advisable to put a substance (e.g., air, nitrogen atmosphere, etc.) having a refractive index lower than that of the shifter 11 in a gap between the outer peripheral surface of the shifter 11 and the inner peripheral surface of a through hole of a scintillator portion 10. The gap may be defined between the inner peripheral surface of a transparent medium (optical pipe portion) 18 of an optical buffer 19 and the wavelength shifter 11 or between the inner peripheral surface of an optical glass tube and the shifter 11, as well as between the inner peripheral surface of the through hole of the scintillator portion 10 and the shifter 11.

Commercially available is a wavelength shift fiber in the form of an optical fiber which has a wavelength shifter as its core member. This shift fiber may be used as a wavelength shifter 11. In this case, the wavelength shift fiber is previously provided with a cladding which ensures internal total reflection, so that the region between the outer peripheral surface of the wavelength shifter 11 and the inner peripheral surface of the through hole need not serve as a cladding. Accordingly, it is preferred to fill the region between the outer peripheral surface of the wavelength shifter 11 and the inner peripheral surface of the through hole with optical grease 20, as shown in FIG. 20, rather than to leave the region to be a vacant space which allows reflection on the boundary surface and confinement of light to the scintillator side.

In a light-guide-type scintillation detector 1, a scintillator portion is divided so that it can propagate light toward a wavelength shifter 11, and its divisions or divisional scintillators 21 are arranged in the form of an optical pipe around the wavelength shifter 11. The respective outer surfaces of the divisional scintillators 21 are polished, and are arranged with narrow gaps between them such that total reflection is ensured inside. Thus, scintillation lights can be efficiently transmitted to the region near the wavelength shifter 11, and finally, the light volume is increased. This split structure may be of any of various configurations.

FIGS. 21, 22 and 23 show examples of this split structure. In the example of FIG. 21, the scintillator portion is divided into fan-shaped divisional scintillators 21, which are arranged so as to surround the wavelength shifter 11. In the example of FIG. 22, cross-shaped divisional scintillators 21 are arranged around the wavelength shifter 11, and additional divisional scintillators 21 are arranged so as to fill the gaps between the cross-shaped scintillators 21. In the example of FIG. 23, fan-shaped divisional scintillators 21 are arranged so as to extend in the diametrical direction of the wavelength shifter 11, and a large number of thin columnar (or prism-shaped) divisional scintillators 21 fill the gaps between the fan-shaped scintillators 21.

The transparent medium (optical pipe portion) 18 of the optical buffer 19 shown in FIGS. 12 and 13 is also divided, and its divisions or divisional transparent media 22 are arranged around the wavelength shifter 11. These divisional transparent media 22 are located so that they can propagate light toward the wavelength shifter 11. The respective outer surfaces of the divisional transparent media 22 are polished, and are arranged with narrow gaps between them such that total reflection is ensured inside. Thus, scintillation lights can be efficiently transmitted to the region near the wavelength shifter 11, and finally, the light volume is increased. This split structure may be of any of various configurations.

FIG. 24 shows an example of this split structure. In this example, the structure includes divisional transparent media 22 which are obtained by cutting a column by means of two slopes and fan-shaped divisional transparent media 22 which are located between the first media.

In an example shown in FIG. 25, optical fibers are combined tight so that a transparent medium 18 of a optical buffer 19 can propagate light toward a wavelength shifter 11. Divisional transparent media 22, in the form of a solid optical fiber or an optical pipe each, are arranged at right angles to the wavelength shifter, and are sandwiched between a pair of disk-shaped divisional transparent media 22. Thus, scintillation lights can be efficiently transmitted to and collected in the region near the wavelength shifter 11, and finally, the light volume is increased.

There is provided a method for constructing a multipoint measuring system which adjusts the radiation detecting efficiency by means of light-guide-type scintillation detectors 1 of the same size.

In the case where the light-guide-type scintillation detectors 1 are connected in series, as in an example shown in FIG. 26, each two adjacent detectors 1 are connected directly to each other without using a first optical fiber 2 so that the distance between them is zero. According to this arrangement, the scintillator is extended substantially in the length direction, and the detecting efficiency is improved.

In an example shown in FIG. 27, two light-guide-type scintillation detectors 1 are stacked in layers or arranged adjacent to each other, and are connected by means of a short first optical fiber 2. According to this arrangement, the thickness or diameter of the scintillator is increased substantially, and the detecting efficiency is improved.

When the respective cores of first, second, and third optical fibers 2, 3 and 4 are laid out, in an example shown in FIG. 28, light-guide-type scintillation detectors 1 are not connected in those regions which require no detecting efficiency. Thus, the level of the detecting efficiency can be adjusted.

The three examples shown in FIGS. 26, 27 and 28 may be used in combination with one another. These examples can be also used in the case where light-guide-type scintillation detectors 1 are connected in parallel for multipoint measurement. When the example shown in FIG. 28 is used, in particular, those optical fibers which are not connected with scintillation detectors 1 need not be laid out.

In the scintillation detectors according to the embodiments described above, the scintillation light condensing efficiency must be improved in order to heighten the signal-to-noise ratio. To attain this, it is necessary to increase the diameter or number of fluorescent substances or fluorescent fibers used. In consequence, it is also necessary to increase the diameter of optical fibers for signal transmission. In practice, however, the thickness of the fibers is limited, so that means is used for bundling a plurality of thin fibers.

In an example shown in FIG. 37, a plurality of thin fluorescent substances or fibers 11 are arranged penetrating a scintillator 10, and thin bundled optical fibers 2 are connected individually to the respective end faces of the fibers 11. In an example shown in FIG. 38, a thick fluorescent substance 11 penetrates the central axis of a columnar scintillator 10, and thin bundled optical fibers 2 are connected to the end face of the substance 11.

If the diameter of the optical fibers for signal transmission is enlarged, an increase in cost is entailed, and the bending radius of the fibers increases. Thus, there are so many restrictions on the cable layout that this arrangement is not practicable.

Theoretically, moreover, lenses, conical light guides, etc. can be used to cause light from the thick fluorescent substance or fiber to be incident upon the thin optical fibers. In this case, however, the angle of incidence cannot be adjusted for the transfer to the optical fibers. In consequence, this means entails too great a loss to be useful.

In the scintillation detectors according to the embodiments described above, furthermore, a plurality of fluorescent substances or fibers must be completely connected to the optical fibers in equal relation in the case where lights are taken out from the opposite ends of the detectors, and the detectors are connected in series for multipoint measurement. Thus, there are many problems on the reproducibility of connection between the fluorescent and optical fibers and the connection loss.

In consideration of these circumstances, the present embodiment is intended to provide a scintillation detector which can increase the volume of received light in a manner such that the continuity of the optical path is maintained by connecting the fluorescent substances or fibers and the optical fibers in equal relation by means of the thin optical fibers for transmission.

Figure 29:
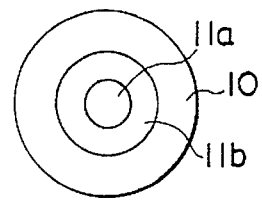
FIGS. 29A and 29B are a perspective view and a plan view, respectively, showing a scintillator and wavelength shifter of a light-guide-type scintillation detector of one basic configuration.
Figure 29:
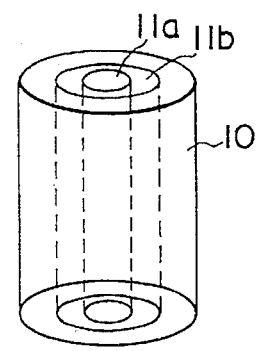

FIG. 29 shows an embodiment of a center-guide-type scintillator in which wavelength shifters are arranged along the central axis of the system of a columnar scintillator. A first wavelength shifter 11a which penetrates the central axis of the scintillator 10 is provided with a fibrous cladding, and is surrounded by a second wavelength shifter 11b, which is formed of a fluorescent material of the same type as that of the first shifter 11a, so that the shifters are in intimate optical contact with each other. FIG. 30 is cross-sectional view of the center-guide-type scintillator. The first and second wavelength shifters 11a and 11b and the scintillator 10 are arranged concentrically in intimate optical contact with one another.

In the embodiment of FIG. 9 and other embodiments, a fluorescence is emitted only when a scintillation light passes through the central axis of the system of the columnar scintillator. In the embodiment shown in FIGS. 29 and 30, however, some of lights emitted from the second wavelength shifter 11b are delivered as oblique light components through the first wavelength shifter 11a, and are transmitted by means of optical fibers 2 which are connected to the respective end faces of the shifters. Scintillation lights can be propagated as oblique light beams to be incident upon the first wavelength shifter 11a without the use of the second wavelength shifter 11b. However, many of these lights are already converted into fluorescences. Very few scintillation lights which have escaped from fluorescent conversion and absorption are subject to so great a transmission loss in the optical fibers for transmission that they cannot be conducive to the final light volume. According to the present embodiment, however, lights converted into fluorescences by the second wavelength shifter 11b are subject to only a small transmission loss in the optical fibers 2, so that they can increase the final light volume.

FIG. 31 shows a specific example of the scintillation detector according to the present embodiment. A first wavelength shifter 11a penetrates the center of a scintillator 10 of a columnar light-guide-type scintillation detector, and the scintillator 10 is covered by a housing 8 outside. Optical fibers 2 for transmission are connected to the optical input and output portions of the first wavelength shifter 11a by means of optical connectors, individually. The first wavelength shifter 11a used in this example is formed of a plastic fiber. It is surrounded by a second wavelength shifter 11b which is formed of a material containing a fluorescent substance of the same type as the core member and is not provided with a cladding. The second wavelength shifter 11b is a cylindrical member whose inner and outer walls are in contact with the first wavelength shifter 11a and the scintillator 10, respectively. The gaps between these members must be filled with optical grease or the like so that the members are in intimate optical contact with one another.

The scintillation lights are converted into fluorescences by both the first and second wavelength shifters 11a and 11b. Among the fluorescences generated in the first wavelength shifter 11a, those ones which are totally reflected are transmitted to the end face of the first wavelength shifter 11a. Among the fluorescences which are generated in the second wavelength shifter 11b and cross the first wavelength shifter 11a, those ones which correspond to oblique light components capable of reaching the first wavelength shifter 11a are transmitted directly to the end face of the shifter 11a without being absorbed, and are incident upon the optical fibers 2 which are connected to the shifter 11a by means of the optical connectors 13. Moreover, some of lights which have reached the first wavelength shifter 11a without being absorbed by the second wavelength shifter 11b are absorbed and converted into fluorescences.

On the other hand, incident lights from the optical fibers 2, as in the case of the embodiment of FIG. 9 and the like, are propagated through the first wavelength shifter 11a, and are delivered again through the other end to the optical fibers 2 which are connected to the shifter 11a by means of the optical connectors 13. Thus, with respect to the function of external penetrative transmission, this arrangement serves in the same manner as the embodiment of FIG. 9 and other embodiments. The second wavelength shifter 11b has no part in this penetrative transmission at all, and is conducive only to the condensing rate of scintillation lights generated therein.

Figure 32:
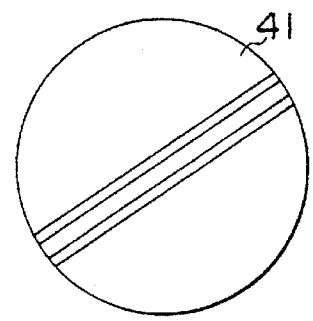
FIGS. 32A and 32B are a perspective view and a plan view, respectively, showing a scintillator and wavelength shifter of a light-guide-type scintillation detector of another basic configuration.
Figure 32:
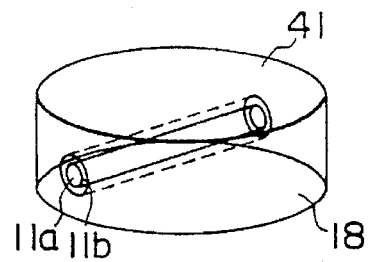
Figure 39:
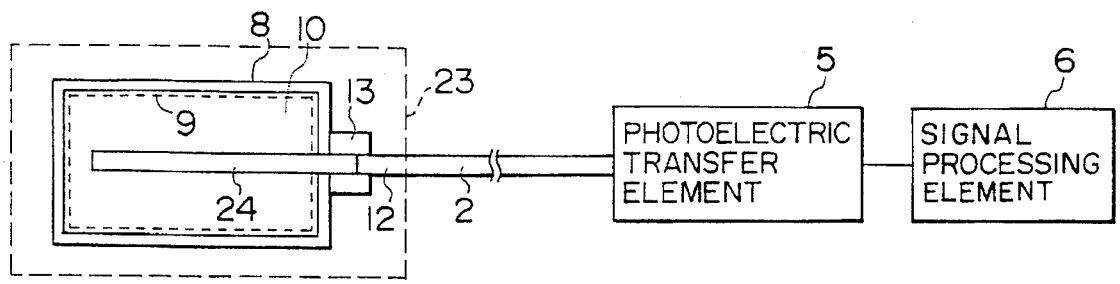
FIG. 39 is a diagram showing a conventional radiation measuring apparatus.
Figure 40:
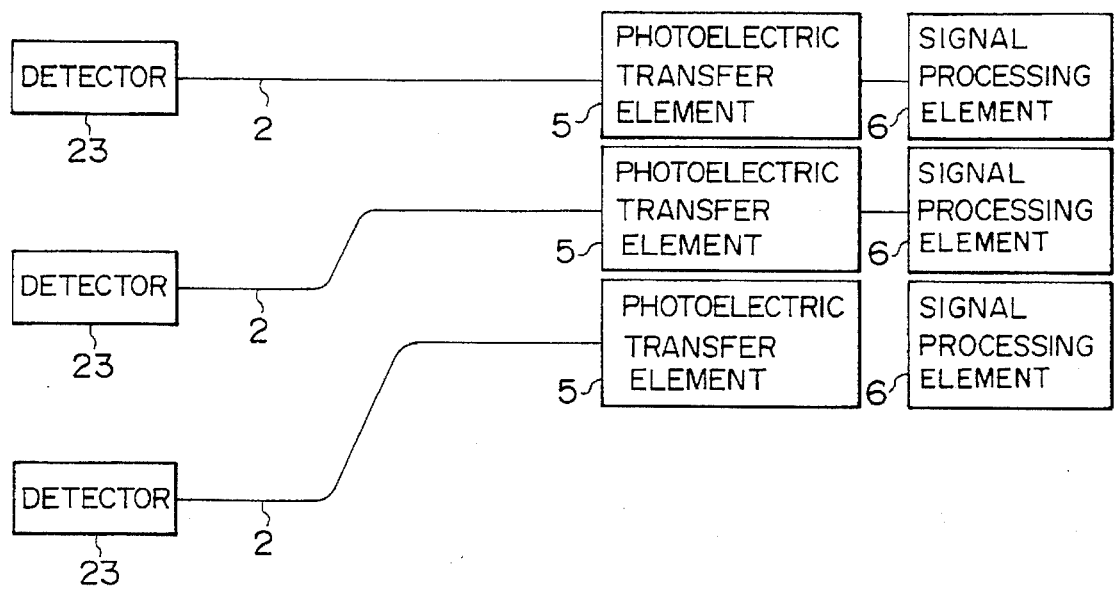
FIG. 40 is a diagram showing a conventional multipoint measuring apparatus.
Figure 41:
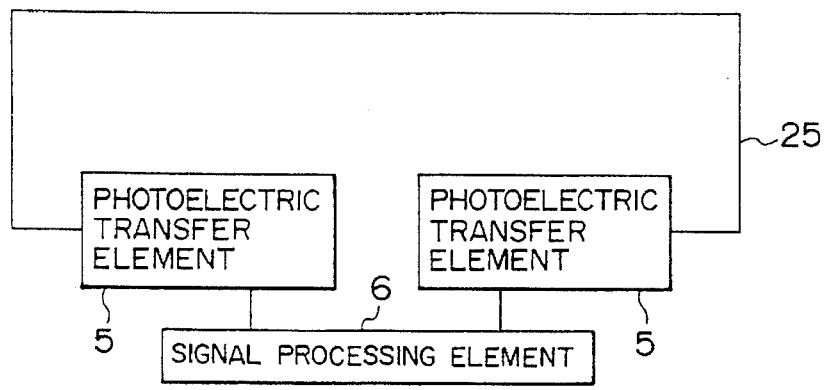
FIG. 41 is a diagram showing a conventional distribution measuring apparatus.

FIG. 32 shows an embodiment of an end-guide-type light condensing adapter for attachment to a general columnar scintillator. First and second wavelength shifters 11a and 11b penetrate a transparent medium 18 which is formed of acrylic resin or glass. A circular cross section of the transparent medium 18 forms a scintillation light incidence surface 41. According to this arrangement, the scintillation light incidence surface 41 is brought intimately into contact with a light outlet surface of an ordinary columnar scintillator. Since the principle of light condensing is the same as in the case of FIG. 29, the same effect can be obtained.

FIG. 33 shows a specific example of the end-guide-type light condensing adapter according to this embodiment. First and second wavelength shifters 11a and 11b are constructed in the same manner as the ones shown in FIG. 31. In the case of the present embodiment, however, the second wavelength shifter 11b is surrounded by a transparent medium 18 which is formed of acrylic resin or glass. The gap between the medium 18 and the second wavelength shifter 11b is filled with optical grease or the like so that these members are in intimate optical contact with each other.

The end face of a columnar scintillator 10 is brought into intimate optical contact with a scintillation light incidence surface 41 by means of the optical grease or the like. Scintillation lights are allowed to penetrate the transparent medium 18. The same processes for the case of FIG. 31 are repeated thereafter. Also in the present embodiment, therefore, the same effects of the embodiment shown in FIGS. 29 to 31 can be obtained.

FIG. 34 shows an embodiment in which wavelength shifters without a cladding are arranged along the central axis of the system of a columnar scintillator. In order to effect transmission by total reflection by means of a first wavelength shifter 11a which penetrates the central axis of the scintillator 10, in this case, an inert gas 42, such as air or nitrogen, must be used as a cladding. The inert gas 42 is surrounded by a second wavelength shifter 11b, which is formed of the same material as the first wavelength shifter 11a, with a gap between the gas and the shifter 11b. This arrangement can produce the same effect of the arrangement shown in FIGS. 29 to 31. The present embodiment is also applicable to the end-guide-type light condensing adapter shown in FIGS. 32 and FIGS. 35 and 36 show embodiments in which a laminar wavelength shifter is used. FIG. 35 shows a center-guide type in which a first wavelength shifter 11a penetrates the center of a columnar system, and FIG. 36 shows an end-guide-type light condensing adapter which is attached to an ordinary columnar scintillator.

In FIG. 35, a columnar scintillator 10 is halved in the longitudinal direction, and a laminar second wavelength shifter 11b is brought into intimate optical contact with the divided scintillator 10 with use of an inert gas. The columnar scintillator 10 may be divided into four parts, as indicated by broken lines in FIG. 3, or more.

In the case where the first wavelength shifter 11a is provided with a cladding, the end face of the second wavelength shifter 11b is in intimate optical contact with the first wavelength shifter 11a. Fluorescences generated in the laminar second wavelength shifter 11b are transmitted to the planar end face of the shifter 11b, and are applied therefrom to the first wavelength shifter 11a. Some of these fluorescences are propagated as oblique light beams through the first shifter 11a. Thus, the same effect of the arrangement shown in FIGS. 29 to 31 can be obtained.

The end-guide-type light condensing adapter shown in FIG. 36 also includes a laminar second wavelength shifter.

In the case shown in FIG. 35 or 36 where the second wavelength shifter is laminar in shape and the first wavelength shifter 11a has no cladding, the respective end faces of the first and second wavelength shifters 11a and 11b are not in intimate optical contact with each other, and an inert gas, such as air or nitrogen, is put in the gap between the shifters 11a and 11b. Thus, the same effect of the arrangement shown in FIGS. 29 to 31 can be obtained.

In an arrangement according to the present invention, as described above, each scintillation detector is provided with two light outlet ports, and a plurality of scintillation detectors are connected in series with one another at each outlet port. Accordingly, radiation can be measured by means of few measuring devices without being influenced by noises and without requiring use of power sources, electronic circuits, etc. in places of measurement. Moreover, high-efficiency multipoint measurement can be carried out at low cost.

In another arrangement, each scintillation detector is provided with two light outlet ports, and a plurality of scintillation detectors are connected in parallel with one another at each outlet port. Also in this case, radiation can be measured by means of few measuring devices without being influenced by noises and without using power sources, electronic circuits, etc. in places of measurement. Moreover, high-efficiency multipoint measurement can be carried out at low cost.

According to still another arrangement, the wavelength shifter itself serves as a light guide, so that lights generated in the wavelength shifter are delivered substantially simultaneously to the optical fibers at the opposite ends of the shifter. At the same time, lights generated in another scintillation detector are landed on one end of the wavelength shifter from the optical fiber side, propagated to the other end through the wavelength shifter as the light guide, and emitted again to the other optical fiber side.

According to a further arrangement, one wavelength shifter has a function to transmit incident light from one end face thereof to the other, and another wavelength shifter is provided additionally. Accordingly, light beams of wavelengths capable of propagation in the wavelength shifters can be externally introduced as oblique light beams. Thus, the light condensing efficiency can be improved, so that the signal-to-noise ratio of the detectors can be heightened.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A radiation measuring apparatus, comprising:

a plurality of scintillation detectors, each having two light outlet ports through which lights are simultaneously emitted in accordance with radiation received thereby;

optical fibers for connecting the scintillation detectors in series at the outlet ports and for transmitting the lights emitted from the scintillation detectors through the outlet ports;

photoelectric transfer means for converting the lights transmitted through the optical fibers into electrical signals; and Signal processing means for processing the electrical signals, thereby measuring the radiation, wherein each of said scintillation detectors has a plurality of pairs of light outlet ports, and which further comprises a plurality of sets of optical fibers for connecting the scintillation detectors in series at the pairs of light outlet ports and individually transmitting the lights emitted from the scintillation detectors through the light outlet ports.

2. A radiation measuring apparatus, comprising:

a plurality of scintillation detectors, each having two light outlet ports through which lights are simultaneously emitted in accordance with radiation received thereby;

optical fibers for connecting the scintillation detectors in series at the outlet ports and for transmitting the lights emitted from the scintillation detectors through the outlet ports;

photoelectric transfer means for converting the lights transmitted through the optical fibers into electrical signals; and signal processing means for processing the electrical signals, thereby measuring the radiation, wherein said photoelectric transfer means includes two photoelectric transfer elements provided at opposite ends of series-connected optical fibers, and said signal processing means identifies a scintillation detector as a light source in accordance with a difference of arrival time or light volume measured between two lights emitted from two light outlet ports of a scintillation detector and received by the two photoelectric transfer elements.

3. The radiation measuring apparatus according to claim 2, wherein said signal processing means does not count two lights, concluding that the two lights are not from the same scintillation detector, when there is a difference greater than a predetermined value between a light volume difference estimated from optical paths from a source of emitted light to the photoelectric transfer elements and a measured light volume difference.

4. A radiation measuring apparatus, comprising:

a plurality of scintillation detectors, each having two light outlet ports through which lights are simultaneously emitted in accordance with radiation received thereby;

optical fibers for connecting the scintillation detectors in series at the outlet ports and for transmitting the lights emitted from the scintillation detectors through the outlet ports;

photoelectric transfer means for converting the lights transmitted through the optical fibers into electrical signals; and signal processing means for processing the electrical signals, thereby measuring the radiation, wherein said photoelectric transfer means includes one photoelectric transfer element located at one end of a series-connected optical fiber group and wherein a reflector is located at the other end of the optical fiber group to reflect light transmitted through the optical fibers, wherein said signal processing means identifies a scintillation detector as a light source in accordance with a difference of arrival time or light volume measured between two lights received by the one photoelectric transfer element, one of the lights being emitted from one light outlet port of a scintillation detector and transmitted through the optical fibers, and the other light being emitted from the other light outlet port and reflected by the reflector to be transmitted reversely through the scintillation detectors and the optical fibers.

5. A radiation measuring apparatus, comprising:

a plurality of scintillation detectors, each having two light outlet ports through which lights are simultaneously emitted in accordance with radiation received thereby;

a plurality of optical fibers for connecting the scintillation detectors in parallel at the outlet ports and for transmitting the lights emitted from the scintillation detectors through the outlet ports;

photoelectric transfer means for converting the lights transmitted individually through the optical fibers into electrical signals; and signal processing means for processing the electrical signals, thereby measuring the radiation, wherein each of said scintillation detectors has a plurality of pairs of light outlet ports, and which further comprises a plurality of sets of optical fibers for connecting the scintillation detectors in parallel at the pairs of light outlet ports and individually transmitting the lights emitted from the scintillation detectors through the light outlet ports.

6. A radiation measuring apparatus, comprising:

a plurality of scintillation detectors, each having two light outlet ports through which lights are simultaneously emitted in accordance with radiation received thereby;

a plurality of optical fibers for connecting the scintillation detectors in parallel at the outlet ports and for transmitting the lights emitted from the scintillation detectors through the outlet ports;

photoelectric transfer means for converting the lights transmitted individually through the optical fibers into electrical signals; and signal processing means for processing the electrical signals, thereby measuring the radiation, wherein said photoelectric transfer means includes two photoelectric transfer elements provided at opposite ends of parallel-connected optical fibers, and wherein respective lengths of optical fibers connected to two light outlet ports of each scintillation detector are differentiated to provide a propagation time difference, whereby times of propagation from the two light outlet ports of each scintillation detector are differentiated, and wherein said signal processing means identifies a scintillation detector as a light source in accordance with a difference of arrival time or light volume measured between two lights emitted from two light outlet ports of each scintillation detector and received by the two photoelectric transfer elements.

7. A radiation measuring apparatus, comprising:

a plurality of scintillation detectors, each having two light outlet ports through which lights are simultaneously emitted in accordance with radiation received thereby;

a plurality of optical fibers for connecting the scintillation detectors in parallel at the outlet ports and for transmitting the lights emitted from the scintillation detectors through the outlet ports;

photoelectric transfer means for converting the lights transmitted individually through the optical fibers into electrical signals; and signal processing means for processing the electrical signals, thereby measuring the radiation, wherein said photoelectric transfer means includes one photoelectric transfer element located at respective first ends of a plurality of parallel-connected optical fibers and wherein a reflector is located at respective other ends of the parallel-connected optical fibers to reflect light transmitted through the optical fibers, wherein respective lengths of optical fibers connected to two light outlet ports of each scintillation detector are differentiated to provide a propagation time difference, whereby times of propagation from the two light outlet ports of each scintillation detector are differentiated, and wherein said signal processing means identifies a scintillation detector as a light source in accordance with a difference of arrival time or light volume measured between two lights received by the one photoelectric transfer element, one of the lights, being emitted from one light outlet port of each scintillation detector and transmitted through the optical fibers, and the other light being emitted from the other light outlet port and reflected by the reflector to be transmitted reversely through the scintillation detectors and the optical fibers.

8. A radiation measuring apparatus, comprising:

a plurality of scintillation detectors, each having two light outlet ports through which lights are simultaneously emitted in accordance with radiation received thereby;

optical fibers for connecting the scintillation detectors in series at the outlet ports and for transmitting the lights emitted from the scintillation detectors through the outlet ports;

photoelectric transfer means for converting the lights transmitted through the optical fibers into electrical signals; and signal processing means for processing the electrical signals, thereby measuring the radiation, wherein said signal processing means identifies a scintillation detector as a source of emitted light in accordance with a difference in wavelength between the lights transmitted through the optical fibers.

9. The radiation measuring apparatus according to claim 8, wherein said signal processing means does not count two lights, concluding that the two lights are not from the same scintillation detector, when a property of measured light differs from an expected value by more than a predetermined amount.

10. In a radiation measuring apparatus which includes a plurality of scintillation detectors, each having two light outlet ports through which lights are simultaneously emitted in accordance with radiation received thereby, optical fibers connected to the scintillation detectors to transmit the lights emitted through the outlet ports, photoelectric transfer means for converting the lights transmitted through the optical fibers into electrical signals, and signal processing means for processing the electrical signals, thereby measuring the radiation, each of said scintillation detectors comprising:
a scintillator for emitting a scintillation light in accordance with radiation received thereby; and
a wavelength shifter located in optical contact with the scintillator to absorb the scintillation light and emit a fluorescence corresponding thereto and to lead the fluorescence to both ends thereof such that the fluorescence is transmitted to the photoelectric transfer means through the two light outlet ports and the optical fibers communicated therewith, and to allow a fluorescence transmitted from another scintillation detector through the optical fibers to pass,
wherein a plurality of wavelength shifters are arranged in one scintillator and are connected individually to a plurality of optical fibers.

11. In a radiation measuring apparatus which includes a plurality of scintillation detectors, each having two light outlet ports through which lights are simultaneously emitted in accordance with radiation received thereby, optical fibers connected to the scintillation detectors to transmit the lights emitted through the outlet ports, photoelectric transfer means for converting the lights transmitted through the optical fibers into electrical signals, and signal processing means for processing the electrical signals, thereby measuring the radiation, each of said scintillation detectors comprising:
a scintillator for emitting a scintillation light in accordance with radiation received thereby; and
a wavelength shifter located in optical contact with the scintillator to absorb the scintillation light and emit a fluorescence corresponding thereto and to lead the fluorescence to both ends thereof such that the fluorescence is transmitted to the photoelectric transfer means through the two light outlet ports and the optical fibers communicated therewith, and to allow a fluorescence transmitted from another scintillation detector through the optical fibers to pass,
wherein said scintillation detector includes a transparent medium in optical contact with the scintillator to guide the scintillation light from the scintillator to the wavelength shifter,
wherein said scintillation detector also includes another scintillator located on the other side of the transparent medium and in optical contact therewith.

12. In a radiation measuring apparatus which includes a plurality of scintillation detectors, each having two light outlet ports through which lights are simultaneously emitted in accordance with radiation received thereby, optical fibers connected to the scintillation detectors to transmit the lights emitted through the outlet ports, photoelectric transfer means for converting the lights transmitted through the optical fibers into electrical signals, and signal processing means for processing the electrical signals, thereby measuring the radiation, each of said scintillation detectors comprising:
a scintillator for emitting a scintillation light in accordance with radiation received thereby; and
a wavelength shifter located in optical contact with the scintillator to absorb the scintillation light and emit a fluorescence corresponding thereto and to lead the fluorescence to both ends thereof such that the fluorescence is transmitted to the photoelectric transfer means through the two light outlet ports and the optical fibers communicated therewith, and to allow a fluorescence transmitted from another scintillation detector through the optical fibers to pass,
wherein the lights from the two light outlet ports of said scintillation detector are guided to one common photoelectric transfer element of said photoelectric transfer means by two optical fibers and are processed by a signal processing element of said signal processing means.

13. In a radiation measuring apparatus which includes a plurality of scintillation detectors, each having two light outlet ports through which lights are simultaneously emitted in accordance with radiation received thereby, optical fibers connected to the scintillation detectors to transmit the lights emitted through the outlet ports, photoelectric transfer means for converting the lights transmitted through the optical fibers into electrical signals, and signal processing means for processing the electrical signals, thereby measuring the radiation, each of said scintillation detectors comprising:
a scintillator for emitting a scintillation light in accordance with radiation received thereby; and
a wavelength shifter located in optical contact with the scintillator to absorb the scintillation light and emit a fluorescence corresponding thereto and to lead the fluorescence to both ends thereof such that the fluorescence is transmitted to the photoelectric transfer means through the two light outlet ports and the optical fibers communicated therewith, and to allow a fluorescence transmitted from another scintillation detector through the optical fibers to pass,
wherein simultaneous counting of electrical signals is carried out such that, after correcting for any time lag due to a difference in path lengths from opposite ends of the scintillation detector, only simultaneously detected electrical signals are regarded as representing significant optical pulses and those signals which are not simultaneous are regarded as representing noise components generated from photoelectric transfer elements of said photoelectric transfer means.

14. In a radiation measuring apparatus which includes a plurality of scintillation detectors, each having two light outlet ports through which lights are simultaneously emitted in accordance with radiation received thereby, optical fibers connected to the scintillation detectors to transmit the lights emitted through the outlet ports, photoelectric transfer means for converting the lights transmitted through the optical fibers into electrical signals, and signal processing means for processing the electrical signals, thereby measuring the radiation, each of said scintillation detectors comprising:
a scintillator for emitting a scintillation light in accordance with radiation received thereby; and
a wavelength shifter located in optical contact with the scintillator to absorb the scintillation light and emit a fluorescence corresponding thereto and to lead the fluorescence to both ends thereof such that the fluorescence is transmitted to the photoelectric transfer means through the two light outlet ports and the optical fibers communicated therewith, and to allow a fluorescence transmitted from another scintillation detector through the optical fibers to pass, wherein a space is formed between the outer peripheral surface of said wavelength shifter and the inner peripheral surface of a through hole of the scintillator, a transparent medium, or an optical glass tube.

15. The radiation measuring apparatus according to claim 14, wherein said space is filled with optical grease.

16. In a radiation measuring apparatus which includes a plurality of scintillation detectors, each having two light outlet ports through which lights are simultaneously emitted in accordance with radiation received thereby, optical fibers connected to the scintillation detectors to transmit the lights emitted through the outlet ports, photoelectric transfer means for converting the lights transmitted through the optical fibers into electrical signals, and signal processing means for processing the electrical signals, thereby measuring the radiation,.

each of said scintillation detectors comprising:
a scintillator for emitting a scintillation light in accordance with radiation received thereby; and
a wavelength shifter located in optical contact with the scintillator to absorb the scintillation light and emit a fluorescence corresponding thereto and to lead the fluorescence to both ends thereof such that the fluorescence is transmitted to the photoelectric transfer means through the two light outlet ports and the optical fibers communicated therewith, and to allow a fluorescence transmitted from another scintillation detector through the optical fibers to pass, wherein optical fibers are combined tightly with one another such that a transparent medium can propagate light toward the wavelength shifter.

17. In a radiation measuring apparatus which includes a plurality of scintillation detectors, each having two light outlet ports through which lights are simultaneously emitted in accordance with radiation received thereby, optical fibers connected to the scintillation detectors to transmit the lights emitted through the outlet ports, photoelectric transfer means for converting the lights transmitted through the optical fibers into electrical signals, and signal processing means for processing the electrical signals, thereby measuring the radiation, each of said scintillation detectors comprising:
a scintillator for emitting a scintillation light in accordance with radiation received thereby; and
a wavelength shifter located in optical contact with the scintillator to absorb the scintillation light and emit a fluorescence corresponding thereto and to lead the fluorescence to both ends thereof such that the fluorescence is transmitted to the photoelectric transfer means through the two light outlet ports and the optical fibers communicated therewith, and to allow a fluorescence transmitted from another scintillation detector through the optical fibers to pass, wherein said scintillation detectors are coupled to one another for multipoint measurement.

18. A radiation measuring apparatus which comprises a scintillation detector including a scintillator to emit a light in response to incidence of radiation, a first wavelength shifter for absorbing the light emitted from the scintillator and for emitting a light with a longer wavelength, and a circuit which measures the radiation using the light emitted from the first wavelength shifter, said first wavelength shifter being in optical contact with a second wavelength shifter, which is in optical contact with the scintillator.

19. The radiation measuring apparatus according to claim 18, wherein a gas is put in a gap between said first and second wavelength shifters.

20. The radiation measuring apparatus according to claim 18, wherein said first wavelength shifter is in optical contact with said second wavelength shifter in the form of a plate, said first and second wavelength shifters being embedded in optical contact with each other in the scintillator.

21. The radiation measuring apparatus according to claim 20, wherein a gas is put in a gap between said first and second wavelength shifters.

22. A radiation measuring apparatus which comprises a scintillation detector including a scintillator to emit a light in response to incidence of radiation, a first wavelength shifter for absorbing the light emitted from the scintillator and for emitting a light with a longer wavelength, and a circuit which measures the radiation using the light emitted from the first wavelength shifter, said scintillator having a transparent medium fitted on an end face thereof, said first wavelength shifter being in optical contact with a second wavelength shifter, which is in optical contact with the transparent medium.

23. The radiation measuring apparatus according to claim 22, wherein a gas is put in a gap between said first and second wavelength shifters.

24. The radiation measuring apparatus according to claim 22, wherein said first wavelength shifter is in optical contact with said second wavelength shifter in the form of a plate, said first and second wavelength shifters being embedded in optical contact with each other in the transparent medium.

25. The radiation measuring apparatus according to claim 22, wherein a gas is put in a gap between said first and second wavelength shifters.

* * * * *